United States Patent
Simmons

(10) Patent No.: US 8,677,805 B2
(45) Date of Patent: Mar. 25, 2014

(54) METHOD AND APPARATUS FOR DETECTING A LEAK IN A FUEL DELIVERY SYSTEM

(75) Inventor: Walt Simmons, Madison, WI (US)

(73) Assignee: Franklin Fueling Systems, Inc., Madison, WI (US)

( * ) Notice: Subject to any disclaimer, the term of this patent is extended or adjusted under 35 U.S.C. 154(b) by 397 days.

(21) Appl. No.: 12/781,040

(22) Filed: May 17, 2010

(65) Prior Publication Data

US 2010/0288019 A1 Nov. 18, 2010

Related U.S. Application Data

(60) Provisional application No. 61/179,139, filed on May 18, 2009.

(51) Int. Cl.
*G01M 3/28* (2006.01)

(52) U.S. Cl.
USPC .......................... 73/40.5 R; 702/51

(58) Field of Classification Search
USPC ........................... 73/40.5 R; 702/51; 340/605
See application file for complete search history.

(56) References Cited

U.S. PATENT DOCUMENTS

| | | |
|---|---|---|
| 3,350,704 A | 10/1967 | Kessler |
| 3,454,195 A * | 7/1969 | Deters ........................ 222/52 |
| 3,735,634 A | 5/1973 | Clinton et al. |
| 3,745,338 A | 7/1973 | Joyce |
| 3,800,586 A | 4/1974 | Delatorre et al. |
| 4,131,216 A | 12/1978 | Gerstenmaier et al. |
| 4,147,096 A | 4/1979 | Caswell |
| 4,166,485 A | 9/1979 | Wokas |
| 4,215,565 A | 8/1980 | Zanker |
| 4,247,899 A | 1/1981 | Schiller et al. |
| 4,320,653 A | 3/1982 | Bernhardt |
| 4,410,109 A | 10/1983 | Murrell, Jr. et al. |
| 4,442,702 A | 4/1984 | Sawada |
| 4,462,249 A | 7/1984 | Adams |
| 4,508,127 A | 4/1985 | Thurston |
| 4,523,454 A | 6/1985 | Sharp |
| 4,534,208 A | 8/1985 | Macin et al. |
| 4,543,819 A | 10/1985 | Chin et al. |
| 4,566,504 A | 1/1986 | Furrow et al. |
| 4,568,925 A | 2/1986 | Butts |
| 4,570,686 A | 2/1986 | Devine |
| 4,611,729 A | 9/1986 | Gerstenmaier et al. |

(Continued)

FOREIGN PATENT DOCUMENTS

CN 101221633 7/2008
DE 10 2005 048 348 4/2007

OTHER PUBLICATIONS

International Preliminary Report on Patentability dated Nov. 22, 2001 in International Application No. PCT/US2010/035073 (6 pages).

(Continued)

*Primary Examiner* — John Fitzgerald
(74) *Attorney, Agent, or Firm* — Faegre Baker Daniels LLP

(57) ABSTRACT

A leak detection system is provided for detecting a leak in a fuel line. A controller determines the presence of a leak in the fuel line based on an analysis of data obtained from individual leak tests performed on the fuel line, the individual leak tests may span one or more fuel delivery events.

18 Claims, 14 Drawing Sheets

(56) References Cited

U.S. PATENT DOCUMENTS

| | | | |
|---|---|---|---|
| 4,653,334 A | 3/1987 | Capone | |
| 4,670,847 A | 6/1987 | Furuse | |
| 4,680,004 A | 7/1987 | Hirt | |
| 4,687,033 A | 8/1987 | Furrow et al. | |
| 4,749,009 A | 6/1988 | Faeth | |
| 4,827,987 A | 5/1989 | Faeth | |
| 4,835,522 A | 5/1989 | Andrejasich et al. | |
| 4,835,717 A | 5/1989 | Michel et al. | |
| 4,842,027 A | 6/1989 | Faeth | |
| 4,862,734 A | 9/1989 | Elderton | |
| 4,871,450 A | 10/1989 | Goodrich et al. | |
| 4,876,530 A | 10/1989 | Hill | |
| 4,914,943 A | 4/1990 | Lagergren | |
| 4,938,251 A | 7/1990 | Furrow et al. | |
| 4,967,809 A | 11/1990 | Faeth | |
| 4,978,029 A | 12/1990 | Furrow et al. | |
| 4,986,445 A | 1/1991 | Young et al. | |
| 5,013,434 A | 5/1991 | Furrow | |
| 5,014,543 A | 5/1991 | Franklin et al. | |
| 5,027,499 A | 7/1991 | Prohaska | |
| 5,038,838 A | 8/1991 | Bergamini et al. | |
| 5,040,077 A | 8/1991 | Hamano | |
| 5,040,576 A | 8/1991 | Faeth | |
| 5,040,577 A | 8/1991 | Pope | |
| 5,065,350 A | 11/1991 | Fedder | |
| 5,090,234 A | 2/1992 | Maresca, Jr. et al. | |
| 5,103,410 A | 4/1992 | Slocum et al. | |
| 5,116,759 A | 5/1992 | Klainer et al. | |
| 5,129,433 A | 7/1992 | Faeth | |
| 5,131,262 A | 7/1992 | Wood et al. | |
| 5,143,258 A | 9/1992 | Mittermaier | |
| 5,151,111 A | 9/1992 | Tees et al. | |
| 5,156,199 A | 10/1992 | Hartsell, Jr. et al. | |
| 5,165,379 A | 11/1992 | Thompson | |
| 5,195,564 A | 3/1993 | Spalding | |
| 5,203,384 A | 4/1993 | Hansen | |
| 5,216,914 A | 6/1993 | Homer | |
| 5,220,822 A | 6/1993 | Tuma | |
| 5,240,045 A | 8/1993 | Faeth | |
| 5,244,022 A | 9/1993 | Gimby | |
| 5,267,470 A | 12/1993 | Cook | |
| 5,269,353 A | 12/1993 | Nanaji et al. | |
| 5,280,814 A | 1/1994 | Stroh | |
| 5,295,391 A | 3/1994 | Mastandrea et al. | |
| 5,317,899 A | 6/1994 | Hutchinson et al. | |
| 5,319,956 A | 6/1994 | Bogle et al. | |
| 5,323,817 A | 6/1994 | Spalding | |
| 5,325,312 A | 6/1994 | Kidd | |
| 5,325,896 A | 7/1994 | Koch et al. | |
| 5,327,776 A | 7/1994 | Yasui et al. | |
| 5,332,008 A | 7/1994 | Todd et al. | |
| 5,332,011 A | 7/1994 | Spalding | |
| 5,333,654 A | 8/1994 | Faeth | |
| 5,333,655 A | 8/1994 | Bergamini et al. | |
| 5,355,915 A | 10/1994 | Payne | |
| 5,365,985 A | 11/1994 | Todd et al. | |
| 5,369,984 A | 12/1994 | Rogers et al. | |
| 5,375,455 A | 12/1994 | Maresca, Jr. et al. | |
| 5,384,714 A * | 1/1995 | Kidd | 700/282 |
| 5,386,812 A | 2/1995 | Curran et al. | |
| 5,408,866 A | 4/1995 | Kawamura et al. | |
| 5,417,256 A | 5/1995 | Hartsell, Jr. et al. | |
| 5,423,457 A | 6/1995 | Nicholas et al. | |
| 5,448,980 A | 9/1995 | Kawamura et al. | |
| 5,450,883 A | 9/1995 | Payne et al. | |
| 5,452,621 A | 9/1995 | Aylesworth et al. | |
| 5,460,054 A | 10/1995 | Tran | |
| 5,461,906 A | 10/1995 | Bogle et al. | |
| 5,464,466 A | 11/1995 | Nanaji et al. | |
| 5,500,369 A | 3/1996 | Kiplinger | |
| 5,507,325 A | 4/1996 | Finlayson | |
| RE35,238 E | 5/1996 | Pope | |
| 5,526,679 A | 6/1996 | Filippi | |
| 5,535,136 A * | 7/1996 | Standifer | 702/51 |
| 5,542,458 A | 8/1996 | Payne et al. | |
| 5,563,339 A | 10/1996 | Compton et al. | |
| 5,563,341 A | 10/1996 | Fenner et al. | |
| 5,568,828 A | 10/1996 | Harris | |
| 5,571,310 A | 11/1996 | Nanaji | |
| 5,590,697 A | 1/1997 | Benjey et al. | |
| 5,592,979 A | 1/1997 | Payne et al. | |
| 5,625,156 A | 4/1997 | Serrels et al. | |
| 5,626,649 A | 5/1997 | Nanaji | |
| 5,650,943 A | 7/1997 | Powell et al. | |
| 5,663,492 A | 9/1997 | Alapati et al. | |
| 5,665,895 A * | 9/1997 | Hart et al. | 73/1.73 |
| 5,668,308 A | 9/1997 | Denby | |
| 5,671,785 A | 9/1997 | Andersson | |
| 5,689,061 A | 11/1997 | Seitter et al. | |
| 5,719,785 A * | 2/1998 | Standifer | 702/51 |
| 5,720,325 A | 2/1998 | Grantham | |
| 5,731,514 A | 3/1998 | Miwa et al. | |
| 5,752,411 A | 5/1998 | Harpster | |
| 5,755,854 A | 5/1998 | Nanaji | |
| 5,757,664 A | 5/1998 | Rogers et al. | |
| 5,765,121 A | 6/1998 | Schwager et al. | |
| 5,779,097 A | 7/1998 | Olson et al. | |
| 5,780,245 A | 7/1998 | Maroteaux | |
| 5,782,275 A | 7/1998 | Hartsell, Jr. et al. | |
| 5,794,667 A | 8/1998 | Payne et al. | |
| 5,803,136 A | 9/1998 | Hartsell, Jr. | |
| 5,832,967 A | 11/1998 | Andersson | |
| 5,843,212 A | 12/1998 | Nanaji | |
| 5,850,857 A | 12/1998 | Simpson | |
| 5,857,500 A | 1/1999 | Payne et al. | |
| 5,860,457 A | 1/1999 | Andersson | |
| 5,868,175 A | 2/1999 | Duff et al. | |
| 5,878,790 A | 3/1999 | Janssen | |
| 5,889,202 A | 3/1999 | Alapati et al. | |
| 5,890,474 A | 4/1999 | Schnaibel et al. | |
| 5,898,108 A | 4/1999 | Mieczkowski et al. | |
| 5,911,248 A | 6/1999 | Keller | |
| 5,913,343 A | 6/1999 | Andersson | |
| 5,915,270 A | 6/1999 | Lehmann | |
| 5,918,268 A | 6/1999 | Lukas et al. | |
| 5,942,980 A | 8/1999 | Hoben et al. | |
| 5,944,067 A | 8/1999 | Andersson | |
| 5,956,259 A | 9/1999 | Hartsell, Jr. et al. | |
| 5,964,812 A | 10/1999 | Schumacher et al. | |
| 5,985,002 A | 11/1999 | Grantham | |
| 5,988,232 A | 11/1999 | Koch et al. | |
| 5,992,395 A | 11/1999 | Hartsell, Jr. et al. | |
| 6,026,866 A | 2/2000 | Nanaji | |
| 6,037,184 A | 3/2000 | Matilainen et al. | |
| 6,038,922 A | 3/2000 | Mauze et al. | |
| 6,047,745 A | 4/2000 | Fournier | |
| 6,065,507 A | 5/2000 | Nanaji | |
| 6,070,453 A | 6/2000 | Myers | |
| 6,082,415 A | 7/2000 | Rowland et al. | |
| 6,102,085 A | 8/2000 | Nanaji | |
| 6,103,532 A | 8/2000 | Koch et al. | |
| 6,123,118 A | 9/2000 | Nanaji | |
| 6,131,621 A | 10/2000 | Garrard | |
| 6,151,955 A | 11/2000 | Ostrowski et al. | |
| 6,167,747 B1 | 1/2001 | Koch et al. | |
| 6,167,923 B1 | 1/2001 | Hartsell | |
| 6,169,938 B1 | 1/2001 | Hartsell | |
| 6,170,539 B1 | 1/2001 | Pope et al. | |
| 6,223,789 B1 | 5/2001 | Koch et al. | |
| 6,244,310 B1 | 6/2001 | Rowland et al. | |
| 6,247,508 B1 | 6/2001 | Negley, III et al. | |
| 6,289,721 B1 | 9/2001 | Blumenstock | |
| 6,302,165 B1 | 10/2001 | Nanaji et al. | |
| 6,305,440 B1 | 10/2001 | McCall et al. | |
| 6,308,119 B1 | 10/2001 | Majkowski et al. | |
| 6,311,548 B1 | 11/2001 | Breidenbach et al. | |
| 6,325,112 B1 | 12/2001 | Nanaji | |
| 6,336,479 B1 | 1/2002 | Nanaji | |
| 6,338,369 B1 | 1/2002 | Shermer et al. | |
| 6,347,649 B1 | 2/2002 | Pope et al. | |
| 6,357,493 B1 | 3/2002 | Shermer et al. | |
| D457,084 S | 5/2002 | Pope | |
| 6,386,246 B2 | 5/2002 | Pope et al. | |
| 6,418,981 B1 | 7/2002 | Nitecki et al. | |

(56) References Cited

U.S. PATENT DOCUMENTS

| | | | |
|---|---|---|---|
| 6,578,408 B1 | 6/2003 | Denby | |
| 6,622,757 B2 | 9/2003 | Hart et al. | |
| 6,802,344 B2 | 10/2004 | Hart | |
| 6,802,345 B1 | 10/2004 | Hart et al. | |
| 6,880,585 B2 | 4/2005 | Hart et al. | |
| 6,901,786 B2 | 6/2005 | Hart | |
| 6,964,283 B2 | 11/2005 | Hart | |
| 6,968,868 B2 | 11/2005 | Hart et al. | |
| 7,275,417 B2 | 10/2007 | Hart | |
| 8,191,585 B2 | 6/2012 | Mellone et al. | |
| 2003/0136181 A1* | 7/2003 | Balschat et al. | 73/40.5 R |
| 2004/0231404 A1 | 11/2004 | Yamaguchi et al. | |
| 2005/0081612 A1 | 4/2005 | Hosoya et al. | |
| 2005/0107964 A1 | 5/2005 | Wakairo | |
| 2005/0125138 A1 | 6/2005 | Hosoya et al. | |
| 2005/0257780 A1 | 11/2005 | Suzuki | |
| 2005/0262932 A1 | 12/2005 | Hayashi et al. | |
| 2006/0052931 A1 | 3/2006 | Shikama et al. | |
| 2006/0053868 A1 | 3/2006 | Chung et al. | |
| 2006/0130568 A1 | 6/2006 | Ishii et al. | |
| 2007/0079650 A1 | 4/2007 | Streib et al. | |
| 2008/0216916 A1 | 9/2008 | Hart | |
| 2009/0293592 A1 | 12/2009 | Mellone et al. | |

OTHER PUBLICATIONS

State of California, California Environmental Protection Agency, Air Resources Board, Final Statement of Reasons for Rulemaking, Including Summary of Comments and Agency Response, Public Hearing to Consider the Adoption, Amendment and Repeal of Regulations Regarding Certification Procedures and Test Procedures for Gasoline Vapor Recovery Systems, Public Hearing Dates: Mar. 23, 2000, Agenda Item No. 00-3-2 (211 pp.).

Wolf Koch, CARB Needs to Modify Plan for Improving Vapor Recovery Program, Viewpoint: More Time, Better Data Needed, Petroleum Equipment & Technology Magazine (Aug. 1999) (8 pp.).

Wolf Koch, Is CARB Playing Favorites? Unbalanced Treatment of Assist Vapor Recovery Systems, Petroleum Equipment & Technology Magazine (Nov. 1999) (3 pp.).

Ted Tiberi, Recognizing The Total Vapor Picture, Petroleum Equipment & Technology Magazine (Aug. 2000)(6 pp.).

Glen Walker, Separating the Good Air From the Bad, Petroleum Equipment & Technology Magazine (Aug. 2000) (6 pp.).

Robert Bradt, The Latest Word on Thermal Oxidizers, Petroleum Equipment & Technology Magazine (Sep. 2000) (7 pp.).

Koch and Simpson, An Evaluation of CARB's Performance Tests, Petroleum Equipment & Technology Magazine (Oct. 1999) (9 pp.).

Robert Bradt, Retooling the Vapor Recovery System, Petroleum Equipment & Technology Magazine (Aug. 2000) (3 pp.).

Draft Performance Standards for In-Station Diagnostics (to be incorporated into CP-201), California Air Resources Board (Aug. 1999) (1p.).

Robert Bradt, Retooling the Vapor Recovery System, Petroleum Equipment & Technology Magazine (Jul. 2000) (6 pp.).

California Environmental Protection Agency, Air Resources Board, Vapor Recovery Certification Procedure, CP-201, Certification Procedure for Vapor Recovery Systems at Gasoline Dispensing Facilities (Feb. 2001) (45 pp.).

California Environmental Protection Agency, Air Resources Board, Vapor Recovery Test Procedure, TP-201.5, Air to Liquid Volume Ratio (Feb. 2001) (14 pp.).

California Air Resources Board, Title 17, Notice of Public Hearing to Consider Amendments to the Vapor Recovery Certification and Test Procedure Regulations for Enhanced Vapor Recovery (Mar. 2000) (11 pp.).

California Environmental Protection Agency, Air Resources Board, Hearing Notice and Staff Report Enhanced Vapor Recovery Initial Statement of Reasons for Proposed Amendments to the Vapor Recovery Certification and Test Procedures for Gasoline Loading an dMotor Vehicle Gasoline Refueling at Service Stations (Feb. 2000) (140 pp.).

California Air Resources Board, Vapor Recovery Test Methods, Existing Procedures (Apr. 2000) (3 pp.).

California Air Resources Board, Rulemaking on the Amendments to the Vapor Recovery Certification and Test Procedure Regulations for Enhanced Vapor Recovery (Mar. 2000) (5 pp.).

Can Escaping Vapors be Recaptured With New Technology? Petroleum Equipment & Technology Magazine (Apr. 1999) (6 pp.).

California Air Resources Board, Vapor Recovery Certification Procedure, CP-201 (Apr. 1996) (39 pp.).

California Air Resources Board, Vapor Recovery Certification Procedure, TP-201.2 (Apr. 1996) (71 pp.).

California Air Resources Board, Vapor Recovery Certification Procedure, TP-201.3 (Apr. 1996) (28 pp.).

Veeder-Root Company, ORVR Compatiblity and Vapor Recovery Monitoring (Sep. 2004) (2 pp.).

Dennis Weber, et al., Passive Vapor Monitoring of Underground Storage Tanks for Leak Detection (May 1989) (18 pp.).

Zhang, Qimin et al., "Pipeline Leak Detecting Technology and Evaluation", Journal of Chongqing College of Science and Technology, vol. 8, Edition 2, Jun. 30, 2006.

Search Report dated Nov. 12, 2013 in corresponding Chinese Application No. 201080005062.1.

Office Action dated Nov. 21, 2013 in corresponding Chinese Application No. 201080005062.1.

\* cited by examiner

METHOD AND APPARATUS FOR DETECTING A LEAK IN A FUEL DELIVERY SYSTEM

RELATED APPLICATIONS

This application claims the benefit of U.S. Provisional Patent Application No. 61/179,139, filed May 18, 2009, titled METHOD AND APPARATUS FOR DETECTING A LEAK IN A FUEL DELIVERY SYSTEM, the disclosure of which is expressly incorporated by reference herein.

FIELD

The present invention relates to a method and apparatus for detecting a leak in a fuel delivery system, and more particularly to a method and apparatus for detecting a leak in a fuel delivery system by statistically analyzing data obtained from individual leak tests.

BACKGROUND

A common method for detecting leaks in a pressurized pipeline, such as a pipeline for delivering motor fuel from an underground storage tank to a fuel dispenser at a retail fuel station, is to pressurize the pipeline and to then monitor the pipeline pressure over a period of time. If a leak exists in the pipeline, then the pressure in the pipeline will drop accordingly. The rate of the pressure drop is typically proportional to the size of the leak in the pipeline. For example, a larger leak will result in a faster pressure drop, and a smaller leak will result in a slower pressure drop. Some liquids, such as motor fuels, contained in the pipeline have a high coefficient of thermal expansion that may affect the rate of change of the pressure in the pipeline. In some instances, the thermal expansion of the liquid and/or the air contained in the pipeline may mimic a pipeline leak when no leak exists or may mask a leak when a leak does exist, thus leading to a false conclusion regarding pipeline integrity or tightness.

Precision leak tests of fuel delivery systems are required to conform to performance requirements set forth by federal and state mandates. These precision leak tests, such as testing for a 0.2 gallon per hour (GPH) leak or for a 0.1 GPH leak, are often susceptible to errors induced by the thermal expansion of the fluid in the pipeline and other thermal effects. One method of reaching a reliable 0.1 GPH or 0.2 GPH leak test conclusion involves performing a series of individual leak tests in succession and waiting for the results to stabilize, thereby indicating thermal stability of the product contained in the pipeline. This process can take several hours depending on the pipeline size and thermal conditions. Retail fuel stations ordinarily must shut down the fuel delivery system in order to perform these leak tests. Because of the time required to achieve thermal stability and to complete the leak tests, busy retail fuel stations often have difficulty complying with the leak detection precision required by the government-mandated standards.

SUMMARY

In an exemplary embodiment of the present disclosure, a leak detection system for a fuel delivery system including a fuel line is provided. The leak detection system comprises a sensor coupled to the fuel line and a controller coupled to the sensor and configured to perform a plurality of leak tests on the fuel line between periods of fuel delivery based on an output of the sensor. Each respective leak test produces test data used by the controller to determine a measure of a leak rate of the fuel line during the respective test interval. The controller determines the presence of a leak in the fuel line based on the measures of the leak rates for at least a portion of the plurality of leak tests, a first leak test of the portion occurring prior to a first fuel delivery event and a second leak test of the portion occurring subsequent to the first fueling event.

In another exemplary embodiment of the present disclosure, a method of detecting a leak in a fuel delivery system including a fuel line is provided. The method comprises the steps of monitoring a pressure in the fuel line while fuel is not being dispensed by the fuel delivery system during a plurality of test intervals, the plurality of test intervals spanning at least one fuel delivery event by the fuel delivery system, determining with an electronic controller for each test interval a measure of the leak rate of the fuel line during the respective test interval, and determining with the electronic controller based on the measures for the plurality of respective test periods if the fuel line of the fuel delivery system includes a leak greater than a threshold amount.

In yet another exemplary embodiment of the present disclosure, a method and apparatus is provided whereby the results obtained from individual 0.1 GPH and 0.2 GPH leak tests while waiting out thermal effects are accumulated over an extended period of time and stored in a memory of a microprocessor-based controller. The controller then statistically analyzes this data to yield a 0.1 GPH or a 0.2 GPH test conclusion. The method and apparatus may provide precision test results even at busy 24-hour fuel stations within a predetermined time interval without the station owner having to shut down the site in order to permit a conventional precision test to complete. In one embodiment, the predetermined time interval is thirty days.

BRIEF DESCRIPTION OF THE DRAWINGS

The above-mentioned and other features of the invention, and the manner of attaining them, will become more apparent and will be better understood by reference to the following description of embodiments of the disclosure taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

Figure 1:
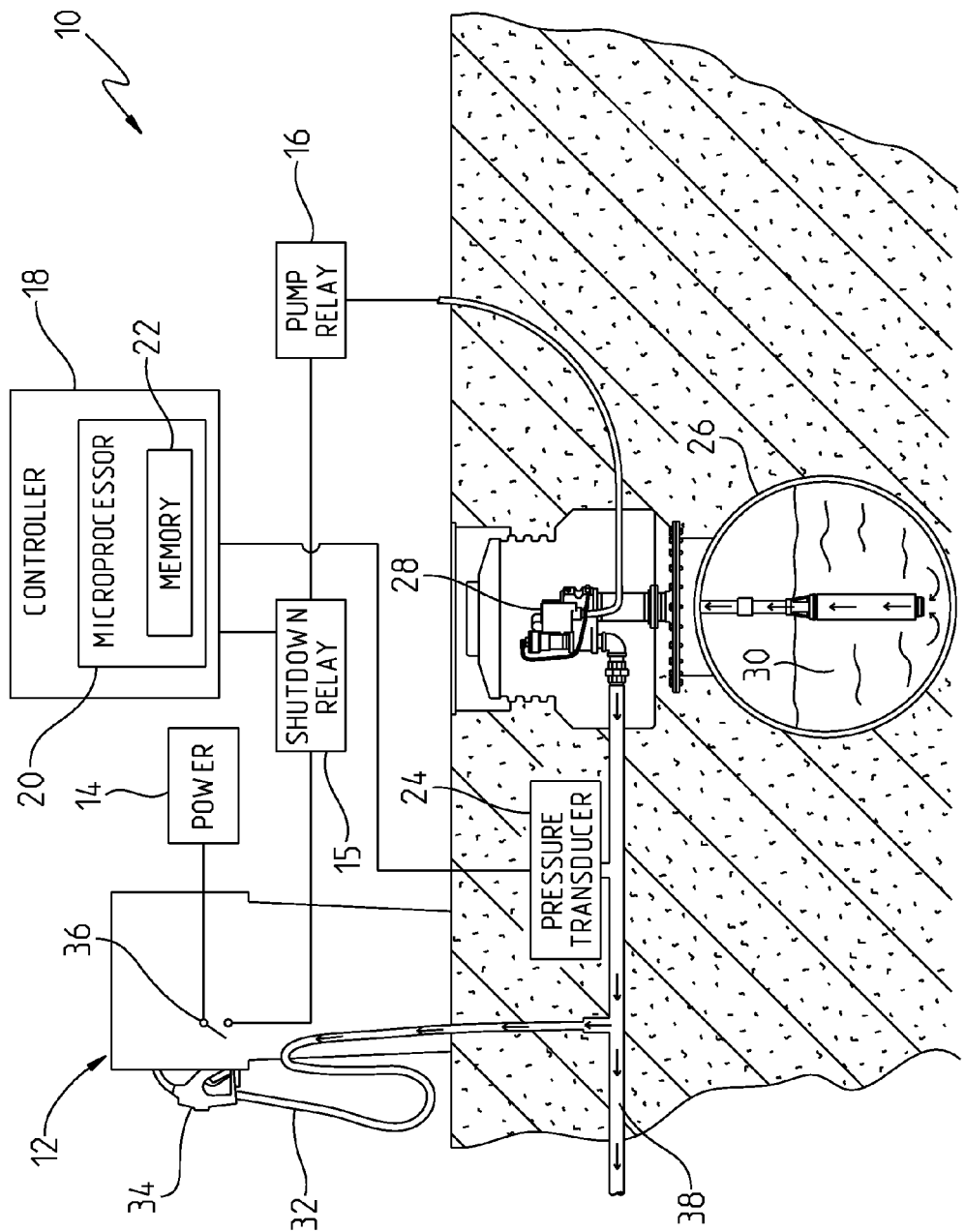
FIG. 1 illustrates a representative view of an exemplary fuel delivery system according to one embodiment.

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, an exemplary fuel delivery system 10 is shown. Fuel delivery system 10 includes a fuel dispenser 12 having a hose 32 and a nozzle 34 for dispensing a liquid product, illustratively fuel 30, from a storage tank 26. Storage tank 26 is illustratively positioned underground but may alternatively be positioned above ground. A pump 28 is provided in storage tank 26 to pump fuel 30 through fuel line 38 and out nozzle 34 of fuel dispenser 12 upon request. Fuel line 38 is illustratively an underground pipeline, although other suitable fuel lines may be used.

A switch 36 closes when fuel dispenser 12 requests fuel 30 from storage tank 26. In one embodiment, the removal of nozzle 34 from fuel dispenser 12 closes switch 36. In one embodiment, switch 36 is closed in response to the actuation of a trigger, such as a handle or a lever, on nozzle 34. Closing switch 36 provides power to a pump relay 16 from a power source 14 to turn on pump 28. In one embodiment, power source 14 provides 115 Volts Alternating Current (VAC) to activate pump relay 16. With switch 36 closed, pump 28 displaces fuel 30 from storage tank 26 to fuel dispenser 12 and out nozzle 34. When fueling is complete, switch 36 is opened by returning nozzle 34 to fuel dispenser 12, releasing the trigger on nozzle 34, or by any other suitable input at fuel dispenser 12 that opens switch 36.

A pressure transducer 24 is coupled to fuel line 38 to detect the pressure level in fuel line 38. Pressure transducer 24 may be positioned in any suitable location along fuel line 38 to facilitate pressure detection within fuel line 38. A controller 18 monitors the output of pressure transducer 24 to detect the pressure level in fuel line 38. Controller 18 may determine the presence of a leak in fuel line 38 based on the monitored pressure level in fuel line 38. In the illustrated embodiment, the output of pressure transducer 24 is proportional to the pressure contained in fuel line 38. In one embodiment, pressure transducer 24 provides an analog voltage or current signal to controller 18 that is proportional to the pressure level in fuel line 38.

In one embodiment, controller 18 is an electronic controller and includes a microprocessor 20 having an associated memory 22. Memory 22 is configured to store data from fuel delivery system 10. Exemplary data stored in memory 22 include the results of leak tests performed by controller 18 on fuel line 38 and/or on storage tank 26. Memory 22 includes leak detection software containing instructions that cause microprocessor 20 to perform a variety of functions, including performing leak tests on fuel delivery system 10, collecting and analyzing data obtained from the tests, and determining a leak test conclusion based on the analyzed data.

In the illustrated embodiment, controller 18 performs individual leak tests on fuel delivery system 10 based on the output of pressure transducer 24. In one embodiment, controller 18 is configured to both perform a 0.1 gallon per hour (GPH) precision leak test and a 0.2 GPH precision leak test. Controller 18 determines whether fuel delivery system 10 passes or fails each leak test based on the determined leak rate in fuel line 38. For example, fuel delivery system 10 fails a 0.1 GPH leak test if controller 18 detects a leak rate greater than or equal to 0.1 GPH in fuel line 38. Similarly, fuel delivery system 10 fails a 0.2 GPH leak test if controller 18 detects a leak rate greater than or equal to 0.2 GPH in fuel line 38. Controller 18 may also perform a "gross" leak test on exemplary fuel delivery system 10, typically immediately after a user dispenses fuel from fuel dispenser 12. A gross leak test checks for large fuel leaks in fuel delivery system 10, such as leaks greater than or equal to 3 GPH. Fuel delivery system 10 fails a 3 GPH gross leak test if controller 18 detects a leak rate greater than or equal to 3 GPH.

In the illustrated embodiment, fuel delivery system 10 is configured to automatically shut down in the event of a failed leak test. In particular, controller 18 opens a shutdown relay 15 upon detection of a failed leak test to prevent current from switch 36 from energizing pump relay 16.

An individual leak test may be performed in a variety of ways. One method of performing an individual leak test is as follows. When fuel 30 is dispensed from nozzle 34, pump 28 is running and fuel line 38 is pressurized. When fuel dispensing is complete, the pressure in fuel line 38 begins to fall rapidly. In one embodiment, a check and relief valve contained in pump 28 closes within a period of time after fuel dispensing is complete to maintain a certain pressure level within fuel line 38. With the pressure level stabilized, pressure transducer 24 and controller 18 continuously monitor the pressure in fuel line 38 over a time interval. A leak in fuel line 38 is indicated by a change in fuel line pressure during the monitored time interval. The length of the time interval may depend on the size of fuel line 38. In one embodiment, the time interval for performing an individual leak test ranges from about 12 minutes to about 20 minutes. Controller 18 calculates the leak rate based on the rate of change in fuel line pressure over the time interval. If the detected leak rate equals or exceeds the limits permitted by the leak test, i.e., if the detected leak rate meets or exceeds 0.1 GPH or 0.2 GPH, then the individual leak test fails. In some instances, the individual leak test is interrupted by resumed fuel dispensing prior to completion of the test, and controller 18 is unable to reach a leak test conclusion.

In one embodiment, each completed individual leak test produces a numerical value termed a pass value. The pass value is a calculated percentage of the permitted leak rate (i.e. either 0.1 GPH or 0.2 GPH) based on the observed pressure decay in fuel line 38. For example, if a 0.2 GPH leak test produces an individual pass value of 40, then the calculated leak rate is 40% of 0.2 GPH, or 0.08 GPH. Similarly, an individual pass value of 140 indicates a calculated leak rate that is 140% of 0.2 GPH, or 0.28 GPH. Any pass value of 100 or greater indicates a failed test or leak condition. Any pass value less than 100 indicates a passed test or non leak condition. In one embodiment, each pass value is stored in memory 22 of controller 18. Similar determinations may be made to determine the leak rate for a 0.1 GPH test.

Conducting only one individual leak test before reaching a test conclusion typically produces erroneous results due to the thermal expansion of the liquid product and other thermal effects that influence the pressure level in fuel line 38. For example, atmospheric air may be introduced into fuel line 38 and/or storage tank 26 upon dispensing fuel at fuel dispenser 12, thereby influencing the temperature level in fuel line 38. An increase in temperature in fuel line 38 and/or storage tank 26 may result in the thermal expansion of fuel 30 and an increase in pressure in fuel line 38. Similarly, a decrease in temperature in fuel line 38 and/or storage tank 26 may result in a contraction of fuel 30 and a decrease in pressure in fuel line 38.

In order to determine if thermal effects are skewing pass values and to reach a reliable leak test conclusion, the thermal effects in fuel line 38 must be stabilized. One method of reaching a reliable 0.1 GPH or 0.2 GPH leak test conclusion, referred to herein as the "standard direct method", is by performing a series of individual 0.1 GPH or 0.2 GPH tests immediately after fuel dispensing to produce an array of pass values and waiting for the pass value results to stabilize. In one embodiment, the series of individual 0.1 GPH or 0.2 GPH leak tests are performed in succession with a small waiting time, such as less than a minute, in between tests. The array of pass values may be analyzed by employing a trend line to determine if fuel line 38 is thermally stable. Once fuel line 38 is determined to be thermally stable, the pass value from the most recently completed individual leak test is used to declare a test conclusion of "pass" or "fail".

To perform a series of individual leak tests between fuel deliveries, fuel line 38 must be re-pressurized following the completion of each individual leak test. In one embodiment, controller 18 turns on pump 28 for a period of time, e.g. 5 to 10 seconds, after each individual leak test. With nozzle 34 of fuel dispenser 12 closed, the pressure in fuel line 38 builds while pump 28 runs. Once controller 18 shuts off pump 28, the check and relief valve contained in pump 28 again closes and stabilizes the pressure within fuel line 38, and another individual leak test may be performed on fuel delivery system 10. This process is repeated for each successive individual leak test.

Figure 2:
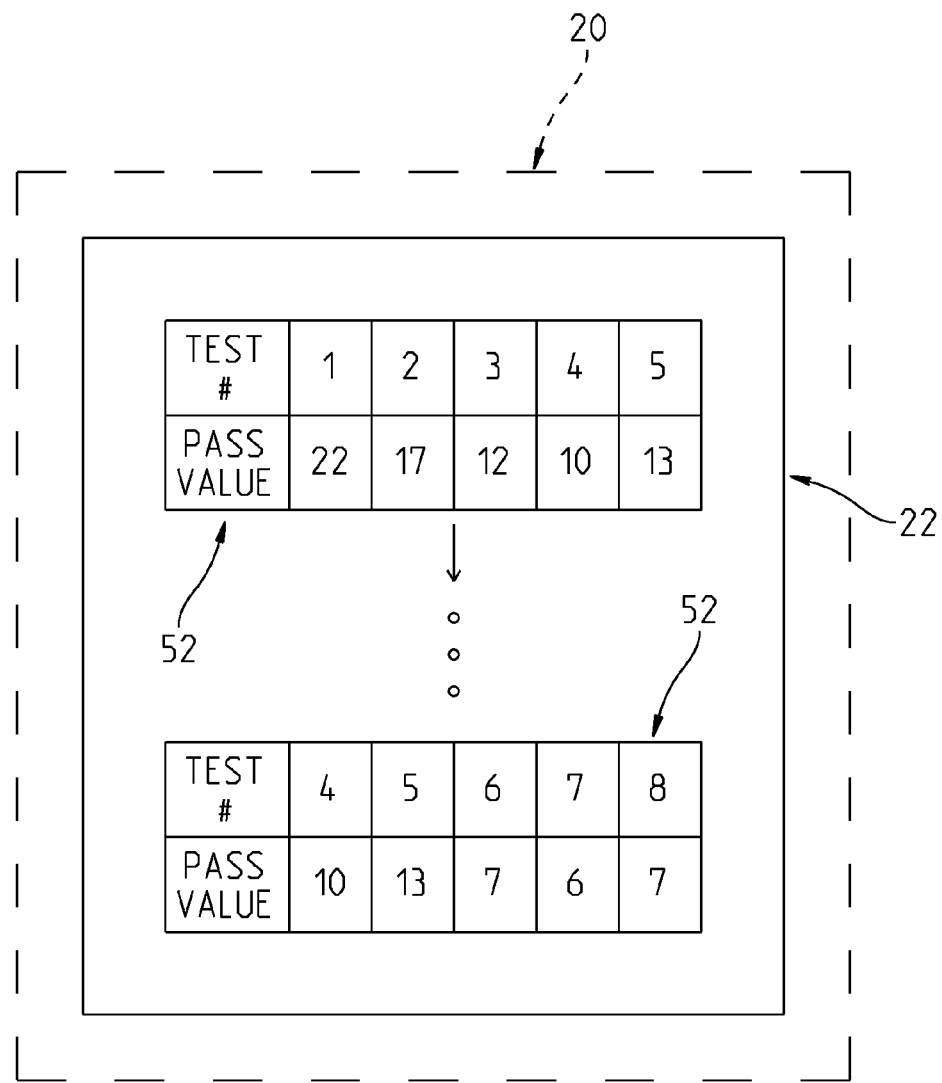
FIG. 2 illustrates an exemplary memory of a controller of the fuel delivery system of FIG. 1.
Figure 3:
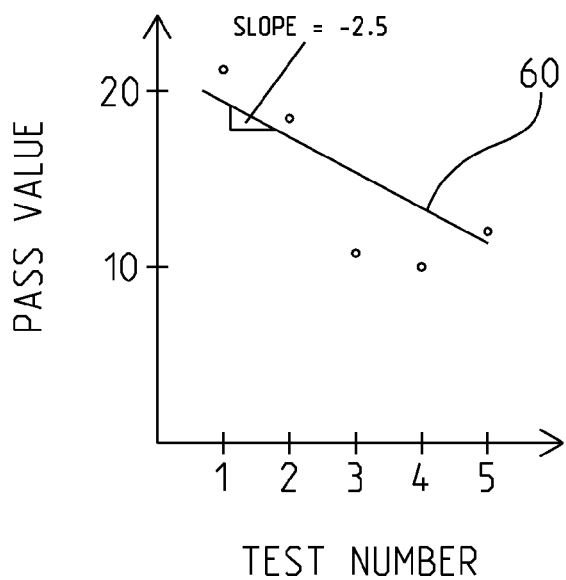
FIGS. 3 and 3A illustrates exemplary graphs representing data acquired by the controller of FIG. 1.
Figure 3A:
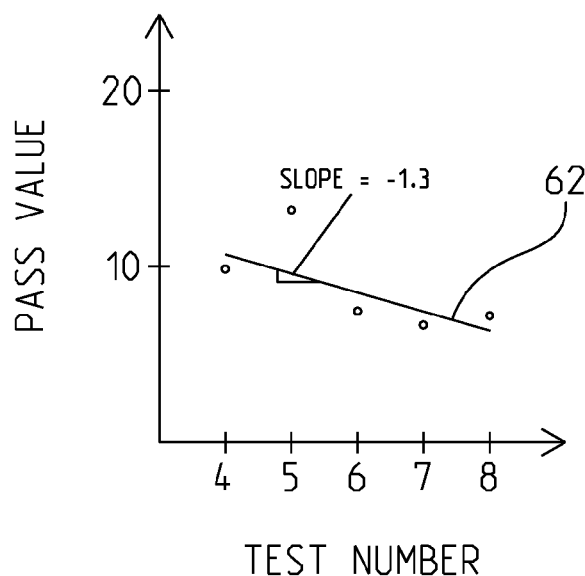

In the standard direct method, the pass value for each individual leak test is stored in a pass value array 52 of memory 22 of microprocessor 20, as illustrated in FIG. 2. Pass value array 52 is fixed in size and represents the n most recent pass values, where n is the size of the pass value array. In the illustrated embodiment, the size n of the pass value array is five, although other suitable array sizes may be implemented. After a sufficient number of individual leak tests have been performed to populate pass value array 52, controller 18 examines the pass values in pass value array 52 to determine if the pass values are stable. In one embodiment, controller 18 calculates a linear trend line of the pass values and observes the slope of the trend line to determine pass value stability, and therefore thermal stability in fuel line 38. Trend lines may be determined utilizing conventional software programs, such as Microsoft Corporation's Excel software. Referring to FIGS. 3 and 3A, exemplary trend lines 60 and 62 each have a different slope corresponding to the pass values of two different pass value arrays 52, as described herein.

In the standard direct method, the slope of the trend line is compared to a threshold slope to determine thermal stability in fuel line 38. If the slope of the observed trend line is greater than the threshold slope, the thermal effects are likely impacting the leak test results. As such, one or more individual leak tests must be performed by controller 18. Upon completion of an additional leak test, the oldest or earliest obtained pass value is discarded from pass value array 52 and the most recently obtained pass value is placed in pass value array 52, as described herein with reference to FIGS. 2 and 3. Once the slope of the trend line is sufficiently level based on the threshold slope, controller 18 concludes fuel line 38 is thermally stable. As such, controller 18 concludes that the pass value of the most recent leak test is a valid test result. As such, a test conclusion may be made by controller 18 based on the most recent pass value. In one embodiment described herein, a trend line having a slope of +/−1.3 or less is acceptable as indicating thermal stability in fuel line 38, although other appropriate threshold slopes may be used to determine thermal stability in fuel line 38.

Referring to FIGS. 2, 3 and 3A and Table 1, exemplary pass value data for 0.2 GPH leak test using the standard direct method is provided. In the following example, the size n of pass value array 52 is five.

TABLE 1

| Standard Direct Method for a 0.2 GPH Leak Test | | |
| --- | --- | --- |
| Test # | Start time | Pass value |
| 1 | 1:57:52 | 22 |
| 2 | 2:10:32 | 17 |
| 3 | 2:23:12 | 12 |
| 4 | 2:35:50 | 10 |
| 5 | 2:48:32 | 13 |

As illustrated in FIG. 2 and in Table 1, the first five successive leak tests result in pass value array 52 initially consisting of 22, 17, 12, 10, 13. As illustrated by trend line 60 in FIG. 3, these pass values result in a slope of about −2.5, which indicates insufficient thermal stability based on a threshold slope of +/−1.3. Accordingly, another individual leak test is performed by controller 18, and the pass value 22 from Test #1 is discarded from pass value array 52.

TABLE 1

(continued)

| Test# | Start time | Pass value |
| --- | --- | --- |
| 6 | 3:01:14 | 7 |

After discarding the first pass value 22 from pass value array 52 and adding the new pass value 7 to pass value array 52, pass value array 52 consists of 17, 12, 10, 13, 7. These pass values result in a trend line for pass value array 52 having a slope of about −1.9, which still indicates insufficient thermal stability based on the threshold slope of +/−1.3. Accordingly, another individual leak test is performed by controller 18, and the pass value 17 from Test #2 is discarded from pass value array 52.

TABLE 1

(continued)

| Test# | Start time | Pass value |
| --- | --- | --- |
| 7 | 3:14:22 | 6 |

After discarding pass value 17 from pass value array 52 and adding the new pass value 6 to pass value array 52, pass value array 52 consists of 12, 10, 13, 7, 6. These pass values result in a trend line for pass value array 52 having a slope of about −1.5, which still indicates insufficient thermal stability based on the threshold slope of +/−1.3. Accordingly, another individual leak test is performed by controller 18, and the pass value 12 from Test #3 is discarded from pass value array 52.

TABLE 1-continued

| Test# | Start time | Pass value |
|---|---|---|
| 8 | 3:27:33 | 7 |

After discarding pass value 12 from pass value array 52 and adding the new pass value 7 to pass value array 52, pass value array 52 consists of 10, 13, 7, 6, 7, as illustrated in FIG. 2. These pass values result in a trend line, illustratively trend line 62 of FIG. 3A, having a slope of about −1.3, which indicates sufficient thermal stability based on the threshold slope of +/−1.3. Therefore, the pass value of 7, the pass value of the most recent individual leak test (Test #8), is utilized by controller 18 as the pass value for reaching a leak test conclusion of either "pass" or "fail".

In the above example of Table 1 and as illustrated in FIGS. 2, 3, and 3A, the size of pass value array 52 is five. Once five successive individual tests are performed, the pass values are analyzed by calculating the trend line of pass value array 52 and then finding the slope of the trend line. In the above example of Table 1, three more successive individual leak tests were performed following the first five leak tests before the slope of the trend line was within a pre-set threshold to indicate fuel line 38 was thermally stable. Once fuel line 38 is considered stable, the last run test (e.g. Test #8 in Table 1) is considered a valid test and its pass value (e.g. seven in Table 1) is used to reach a test conclusion. In the above example, the 0.2 GPH leak test is declared a "pass" since seven is less than 100.

In one embodiment, precision leak tests (i.e. 0.1 or 0.2 GPH leak tests) are continuously performed throughout the day at fuel delivery system 10. In particular, precision leak testing is ongoing as long as fuel dispensing is not taking place at fuel dispenser 12. Fuel dispensing from a nozzle 34 is an exemplary fuel delivery event. In the illustrated embodiment, a "statistical" method may also be implemented to detect a leak in fuel line 38. The statistical method statistically analyzes data obtained from the individual precision leak tests performed over an extended period of time to determine if a leak exists in fuel line 38. As described herein, the statistical method may be used in conjunction with the standard direct method to reach a leak test conclusion.

In one embodiment, controller 18 may also perform a "gross" leak test immediately after each period of fuel dispensing and before performing precision leak tests. A gross leak test quickly tests for large leaks in fuel delivery system 10. One exemplary gross leak test is a 3 GPH leak test.

An exemplary precision leak testing process is as follows. Controller 18 continuously performs precision leak tests between intervals of fuel dispensing. If controller 18 is configured to perform gross leak tests on fuel delivery system 10, the precision leak tests are started immediately after the completion of the gross leak test. In one embodiment, controller 18 first runs 0.2 GPH leak tests. The 0.2 GPH tests will continue to run (between fuel dispensing intervals) until either a 0.2 GPH test conclusion is reached using the standard direct method or, as described herein, there is sufficient data for controller 18 to process and reach a 0.2 GPH test conclusion using the "statistical" method. In one embodiment, once either of these conditions is satisfied, then controller 18 runs 0.1 GPH tests (if the end user has elected to run these tests). Similar to the 0.2 GPH tests, the 0.1 GPH tests will continue until either a 0.1 GPH test conclusion is reached using the standard direct method or there is sufficient data for controller 18 to reach a 0.1 GPH test conclusion using the "statistical" method. Once the 0.1 GPH tests are complete and produce a test conclusion, controller 18 will again start the 0.2 GPH tests. This cycle repeats indefinitely until fuel dispensing commences.

The standard direct method of detecting a leak in fuel line 38 may take several hours before reaching a valid test conclusion. In the above example illustrated in Table 1 and FIGS. 2 and 3, the 0.2 GPH leak test takes about 1.5 hours to complete using the standard direct method. During a leak test using the standard direct method, no fuel dispensing may take place. Upon dispensing fuel from fuel dispenser 12, the leak test immediately aborts, and the entire leak test must start over. At busy fuel station sites, it is common to reach only three or four successive individual tests before testing is interrupted by fuel dispensing. As such, the standard direct method may fail to provide a leak test conclusion at busy fuel station sites.

The statistical method allows controller 18 to reach a precision leak test conclusion even when the standard direct method fails to provide a conclusion. The "statistical" method includes collecting and storing individual leak test results over an extended period of time and analyzing the results to determine if a leak exists in fuel line 38. Referring to FIGS. 4-9, an exemplary statistical method and analysis for reaching a leak test conclusion is illustrated. In one embodiment, the statistical method is performed by controller 18 to reach a precision 0.2 GPH or 0.1 GPH leak test conclusion when the standard direct method fails to reach a test conclusion in a timely manner due to interruptions by fuel dispensing. The statistical method involves three main parts: 1) daily data collection and analysis, 2) short-term analysis, and 3) long-term analysis.

In the daily data collection and analysis portion of the statistical method, controller 18 collects, analyzes, and filters daily pass value data for use in the short-term analysis and in the long-term analysis. Using pre-screened data from the daily analysis, the short-term analysis attempts to reach a leak test conclusion within a shorter period of time than the long-term analysis. In one embodiment, the short-term analysis attempts to reach a test conclusion after ten days of data collection. If a test conclusion cannot be reached by the short-term analysis, the long-term analysis attempts to reach a test conclusion using pre-screened data from the daily analysis. In one embodiment, the long-term analysis attempts to reach a test conclusion after thirty days of data collection. Alternatively, other suitable periods of time may be used by the short-term and long-term analyses to attempt to reach a test conclusion. In one embodiment, the pre-screened pass value data used by the long-term analysis is not as constrained as the pre-screened pass value data used in the short-term analysis.

Daily Data Collection and Analysis

Figure 4:
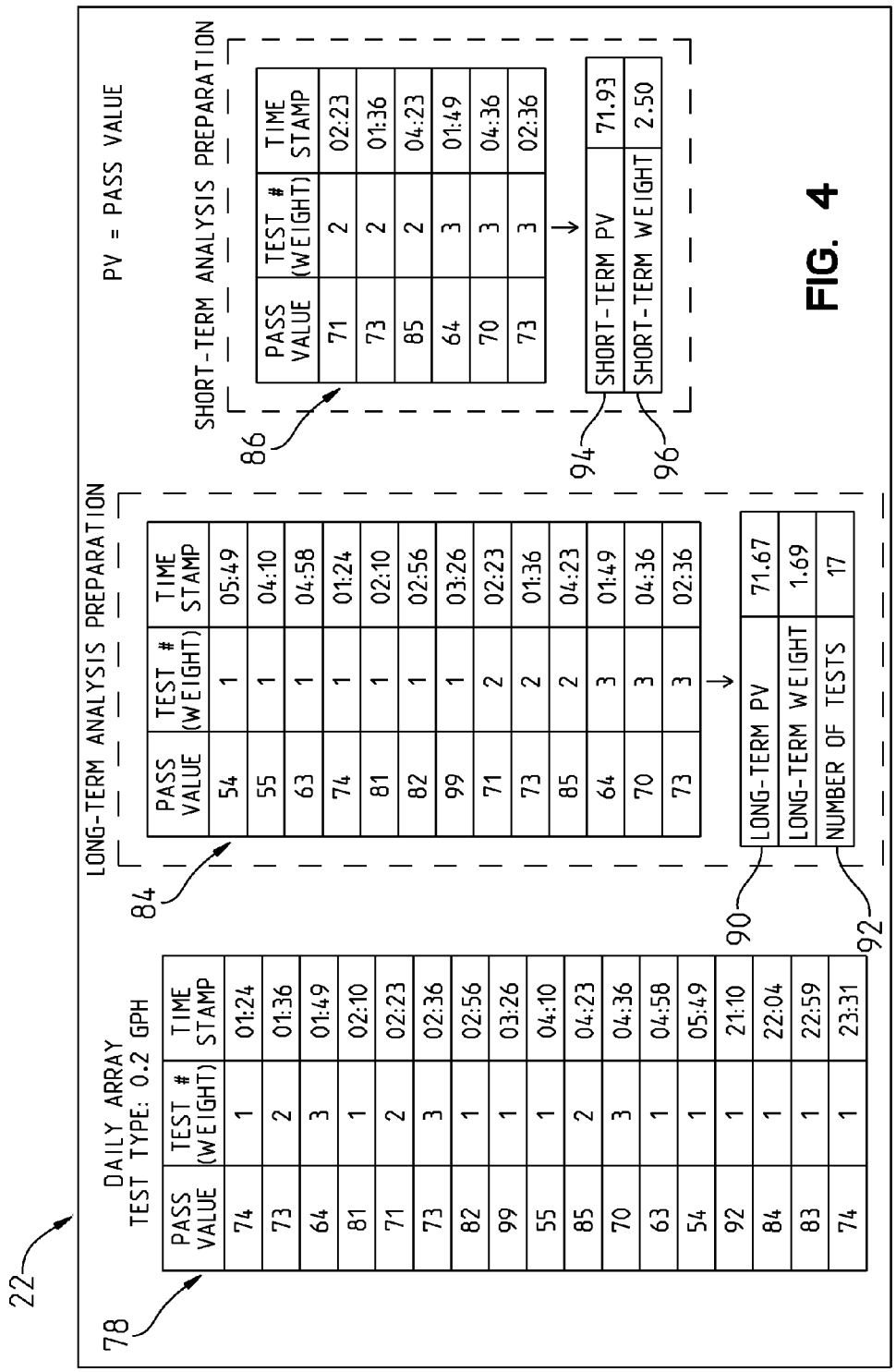
FIG. 4 illustrates another exemplary memory of the controller of FIG. 1.

Under the statistical method, controller 18 collects and stores pass value data accumulated throughout the day in memory 22, as illustrated in FIG. 4. Controller 18 stores all of the pass values obtained from the individual leak tests that were completed throughout the day in a daily array 78. Controller 18 also stores the corresponding weight values of each pass value in daily array 78. As described herein, in one embodiment the weight value is the individual test number associated with the pass value in the succession of individual leak tests. In one embodiment, a higher weight value may indicate a more accurate pass value due to reduced thermal influences in fuel line 38.

If a particular pass value is from a first leak test in a succession of leak tests, its corresponding weight value is "1".

Similarly, if a particular pass value is from a third leak test in a succession of leak tests, its corresponding weight value is "3". Referring to the first four entries of daily array 78 in FIG. 4, pass values 74, 73, 64, 81 have respective weight values 1, 2, 3, 1. Controller 18 also stores in memory 22 a time stamp for each pass value entry along with the type of test being performed (i.e., 0.2 GPH or 0.1 GPH), as illustrated in daily array 78 of FIG. 4. The exemplary pass values and weights in daily array 78 of FIG. 4 are illustrative of one exemplary fuel delivery system 10 over one exemplary 24-hour period.

In the illustrated embodiment, controller 18 performs a daily analysis on the data collected throughout the previous 24 hours. Controller 18 may perform the daily analysis at midnight or at another appropriate time. Controller 18 may alternatively perform the data analysis for other time intervals, such as twice a day, every other day, etc. As described herein, the daily analysis portion of the statistical method reviews the pass value data history of the day (or the previous 24 hours or other time period) and condenses this data history down to one or more pass values that accurately represent the leak tests that occurred during the day. These condensed results are then used in the short-term and long-term analyses of the statistical method. When performing the daily analysis, controller 18 discards pass values that are inaccurate or are potentially inaccurate due to thermal effects or other anomalies. This is accomplished by the application of an averaging function along with a correlation with known fuel deliveries, as described herein.

Figure 8:
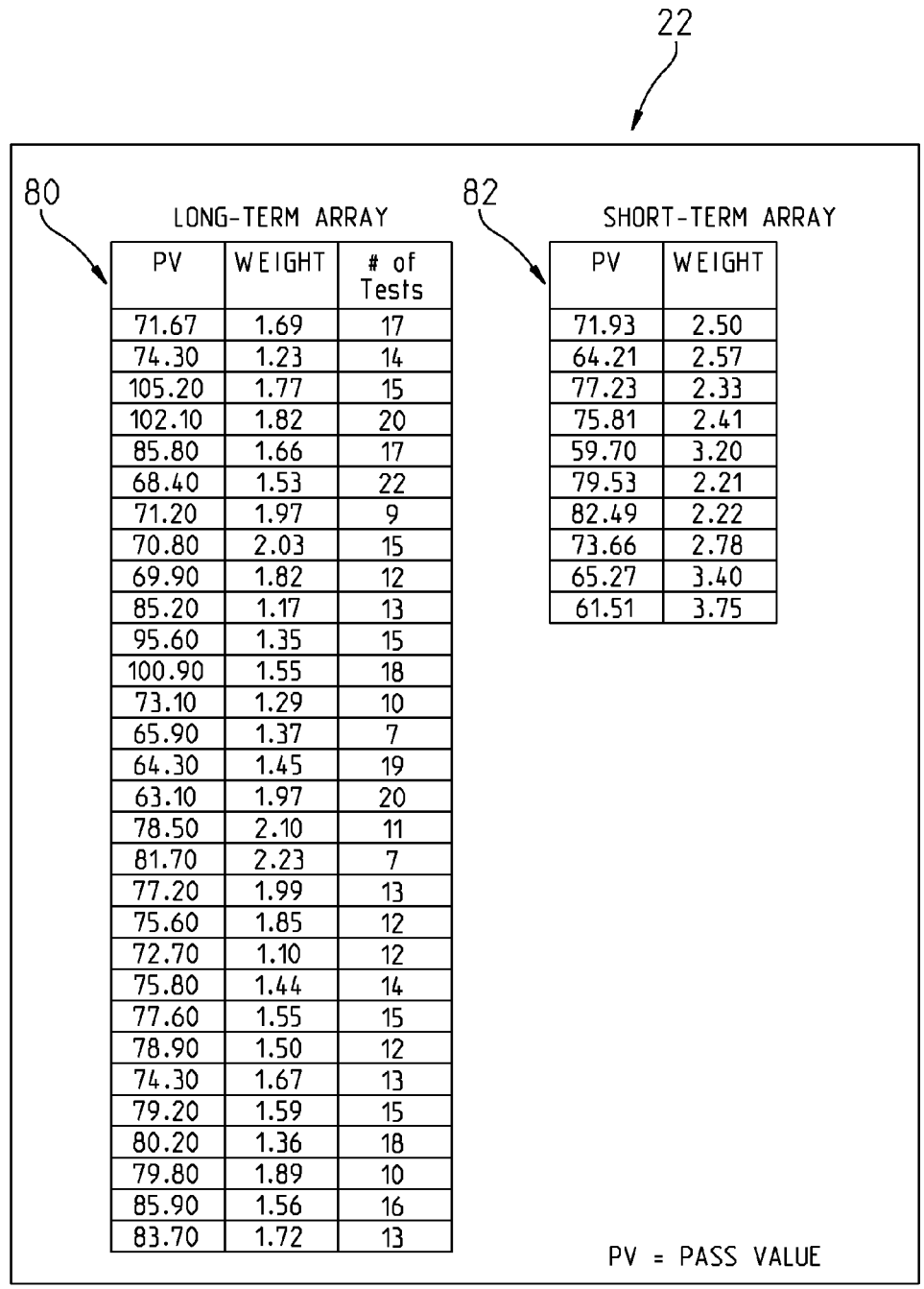
FIG. 8 further illustrates the exemplary memory of FIG. 4.

For example, the results of the daily analysis provide an average pass value, an average weight (accuracy level), and the number of individual tests performed in the day for use in the long-term analysis of the statistical method. In one embodiment, these results are placed in a long-term array 80 in memory 22 of controller 18 for use in the long-term analysis, as illustrated in FIG. 8. Long-term array 80 is illustratively a "history array" such that when long-term array 80 is full and a new value is placed on the array, the oldest value in the array is discarded. In the illustrated embodiment, long-term array 80 is populated with an average pass value from each of the previous 30 days. As such, long-term array 80 has a length of 30, although long-term array 80 may have other lengths.

Similarly, the results of the daily analysis provide an average pass value and an average weight (accuracy level) for use in the short-term analysis of the statistical method. In one embodiment, these results are placed in a short-term array 82 in memory 22 of controller 18 for use in the short-term analysis, as illustrated in FIG. 8. Short-term array 82 is illustratively a "history array" such that when short-term array 82 is full and a new value is placed on the array, the oldest value in the array is discarded. In the illustrated embodiment, short-term array 82 is populated with an average pass value from each of the previous 10 days. As such, short-term array 82 has a length of 10, although short-term array 82 may have other lengths. In one embodiment, the results of the daily analysis are only inserted into short-term array 82 when the collected data from the daily analysis meets certain criteria. For example, in one embodiment, controller 18 requires the use of the highest weighted pass values whenever possible since these are the least likely pass values to be influenced by thermal effects.

Figure 5:
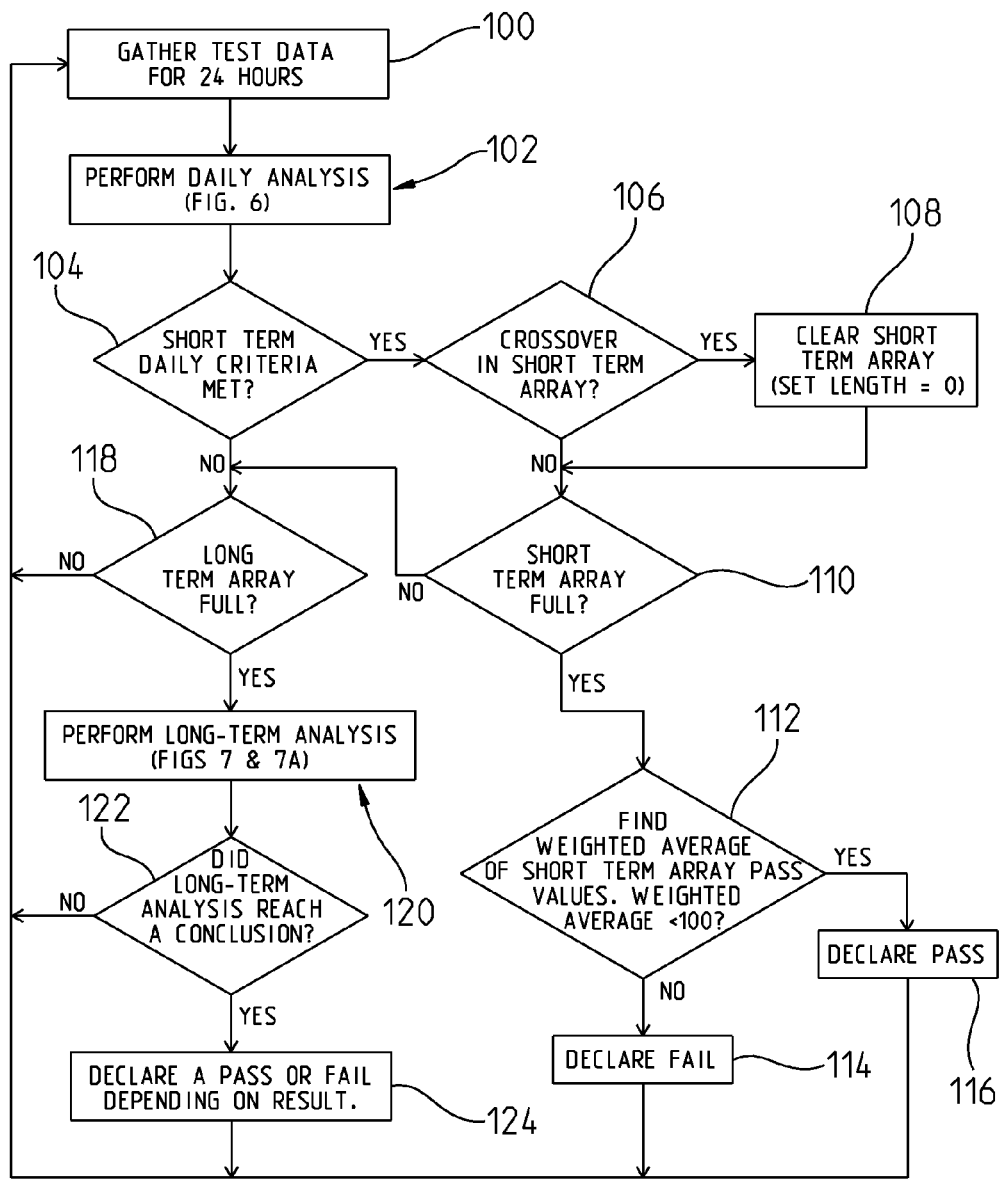
FIG. 5 illustrates a flowchart of an exemplary statistical method for detecting a leak in the fuel delivery system of FIG. 1.

Referring to FIG. 5, a block diagram of the overall statistical method is illustrated. As represented by block 100, controller 18 first gathers individual test data over a 24-hour period. Pass values and their associated weights and time stamps are recorded as entries in daily array 78 (see FIG. 4). After leak test data from the previous 24 hours has been accumulated and stored in memory 22, controller 18 performs a daily analysis on the recorded data, as represented by block 102.

Figure 6:
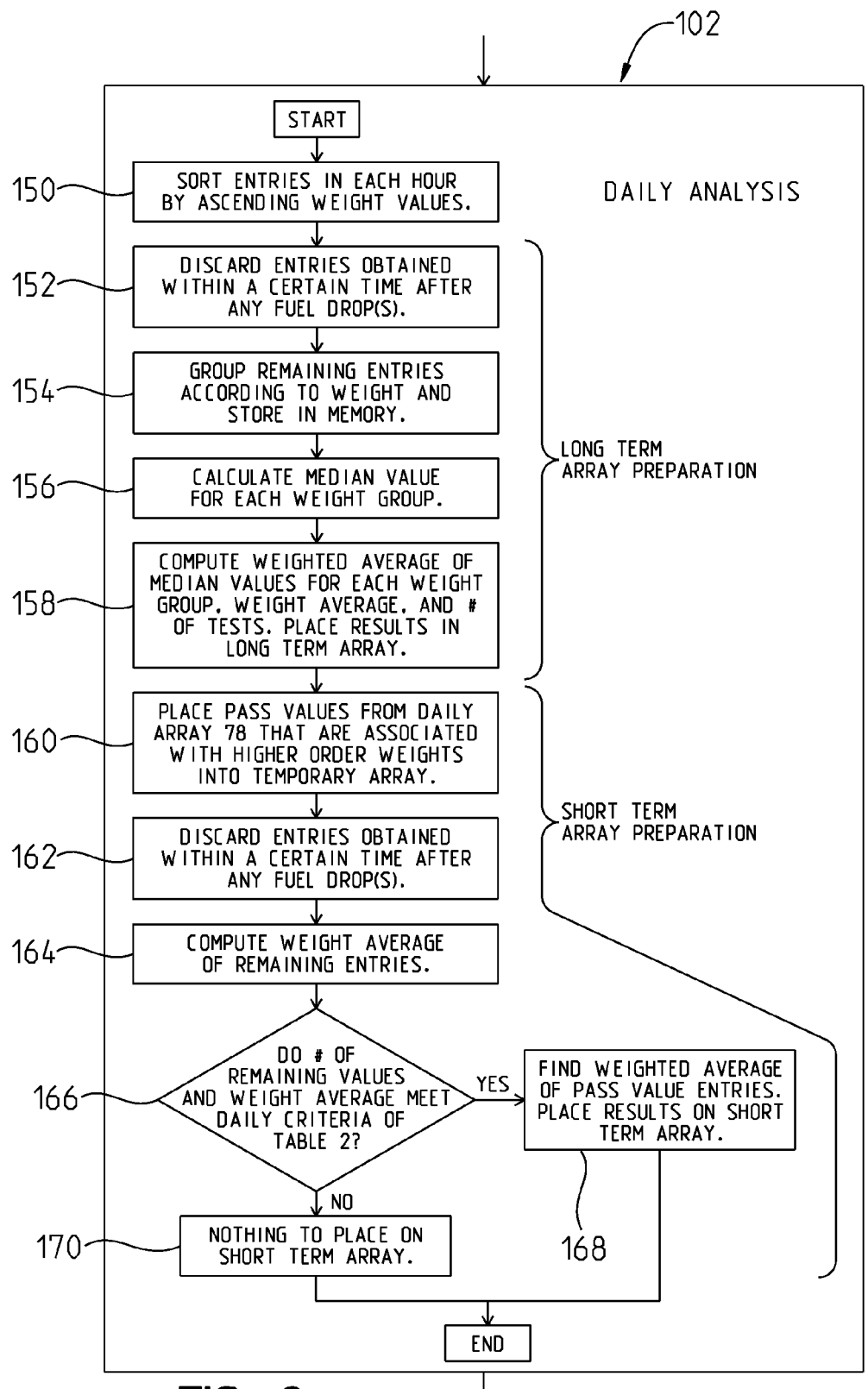
FIG. 6 illustrates a flowchart of an exemplary daily analysis of the statistical method of FIG. 5.

Referring to FIG. 6, a flowchart of an exemplary daily analysis (block 102) is illustrated. As represented by block 150, the stored pass values of daily array 78 are arranged within each hour according to ascending weight values. Blocks 152-158 include steps for preparing pass value data for the long-term analysis. In block 152, any pass values that were obtained within a certain time period after a fuel drop are discarded. A fuel drop is the addition of fuel to storage tank 26 from an external source, such as from a fuel tanker. By removing these pass values from the analysis, the impact of the thermal effects due to any fuel drops is reduced. In one embodiment, pass values obtained within four hours of a fuel drop are discarded, although any appropriate time may be used. For example, if a fuel drop occurred at time 20:00, controller 18 would eliminate all pass value entries from daily array 78 that were obtained between time 20:00 and time 24:00. In the illustrated embodiment, for example, controller 18 eliminates the last four pass values (i.e., pass values 92, 84, 83, 74) from daily array 78 (see FIG. 4) due to the occurrence of a fuel drop at time 20:00. Alternatively, the temperature difference in storage tank 26 and/or fuel line 38 known before and after the fuel drop may determine the number of entries in daily array 78 that are discarded.

As represented by block 154, the remaining pass value entries are copied to a temporary location of memory 22, such as array 84 in FIG. 4, and are grouped according weight value. All pass values associated with weight "1" are grouped together, all pass values associated with weight "2" are grouped together, and so on up to the maximum weight value recorded within the previous 24 hours. In one embodiment, the pass values in each weight group are arranged in ascending order, as illustrated in array 84 of FIG. 4.

In block 156, the median value of the pass values in each weight group of array 84 is determined. In array 84, for example, the median value of weight group "1" is 74, the median value of weight group "2" is 73, and the median value of weight group "3" is 70. As represented by block 158, a weighted average, illustratively long-term pass value 90 (see FIG. 4), of these median values is calculated. In calculating long-term pass value 90, the median values associated with the higher weights are given more weight in the calculation than the median values associated with the lower weights. In particular, a median value with a weight of "1" is included once in the weighted average, a median value with a weight of "2" is counted twice in the weighted average, and so on. Long-term pass value 90 may be represented as:

$$\text{Weighted Average} = (X1 + X2*2 + \ldots + Xn*n)/(1 + 2 + \ldots + n) \quad (1)$$

wherein Weighted Average=long-term pass value 90, X1=the median value from weight group "1", X2=the median value from weight group "2", and Xn=the median value from weight group n. Using the data from array 84 of FIG. 4, X1=74, X2=73, and X3=70. Plugging these values into Equation (1), long-term pass value 90 is equal to about 71.67 (rounded to the nearest one-hundredth), as illustrated in FIG. 4.

In block 158, an average of all weight values for each of the entries in array 84, which are the entries that remain after discarding certain entries in block 152, is also calculated. An exemplary weight value average is long-term weight 92 (see FIG. 4). Based on the entries of array 84, long-term weight 92 is equal to about 1.69 (rounded to the nearest one-hundredth). Long-term pass value 90 and long-term weight 92 are placed at the top of long-term array 80 along with the total number of individual leak tests from the previous day (i.e., from daily array 78), as illustrated in FIG. 8. Long-term array 80 illustratively retains only the 30 most recent pass value entries. If the length of long-term array 80 exceeds 30 entries with the most recent entry, the oldest entry (based on the time stamp) is discarded from long-term array 80.

Upon completing the long-term analysis data preparation and adding an entry to long-term array 80, controller 18 prepares data for the short-term analysis. Blocks 160-168 of the daily analysis illustrate steps for preparing pass value data for the short-term analysis. In block 160, the pass values from daily array 78 that are associated with higher order weight values are selected for use in the short-term analysis and stored in an array 86 (see FIG. 4). Higher order weight values may be represented as:

$$\text{Higher order weight value} = \text{INT}(n/2)+1 \quad (2)$$

wherein INT( ) is a function for calculating the integer value and n is the highest weight value found in daily array 78. For example, the highest weight value of daily array 78 is 3, as illustrated in FIG. 4. According to Equation (2), any entries having a weight value less than INT(3/2)+1=2 are discarded (i.e. all entries having a weight value of "1"), and the remaining entries from daily array 78 are stored in array 86.

As represented by block 162, the entries of array 86 obtained within a certain time after a fuel drop are discarded. In one embodiment, the time period following a fuel drop used to discard entries in block 162 is longer than the time period used to discard entries in block 152 in order to achieve increased accuracy in the short-term analysis. In one embodiment, pass values obtained within six hours of a fuel drop are discarded, although any appropriate time may be used. For example, if a fuel drop occurred at time 20:00, controller 18 eliminates all pass value entries from daily array 78 that were obtained from time 20:00 until time 2:00 of the following day. Alternatively, the temperature difference in storage tank 26 and/or fuel line 38 known before and after the fuel drop may determine the number of entries that are discarded.

As represented by block 164, the average weight of the remaining pass values in array 86 is calculated. An exemplary average weight is short-term weight 96 of FIG. 4. As represented by block 166, short-term weight 96 and the number of the remaining pass values ("N") of array 86 are required to meet specific daily criteria (see Table 2). This criteria requirement increases the likelihood that the remaining entries of array 86 are of a high enough reliability for use in determining the value to be placed in short-term array 82 of FIG. 8.

TABLE 2

Daily Criteria for Short-Term Analysis

| Number of Entries (N) | Minimum Weight Average Required |
|---|---|
| 1 | 3.00 |
| 2 | 2.50 |
| 3 | 2.33 |
| 4 | 2.25 |
| 5+ | 2.20 |

The criteria set forth in Table 2 are set to improve accuracy in the short-term analysis and to stabilize the thermal effects. However, other suitable criteria may be used depending on individual fuel delivery systems.

If the criteria set forth in Table 2 are not satisfied, no entry is made in short-term array 82 and the statistical method returns to block 104 of FIG. 5, as represented by block 170 of FIG. 6. If the criteria set forth in Table 2 are satisfied, then a weighted average, illustratively short-term pass value 94, of the remaining pass values of array 86 is computed, as represented by block 168. In general, the weighted average of pass values in an array may be represented as:

$$WeightedAvg = \frac{\sum_{x=1}^{N}(PV_x * W_x)}{\sum_{x=1}^{N} W_x} \quad (3)$$

wherein WeightedAvg=the weighted average of the pass values in an array, N=the number of entries in the array, $PV_x$=the pass value for entry "x", and $W_x$=the weight associated with the corresponding pass value for entry "x".

Referring to array 86 in FIG. 4, the number of entries N is equal to six, and short-term weight 96 is equal to 2.50. According to the criteria of Table 2, because 2.50 is greater than 2.20, the weighted average of the pass values in array 86 is calculated. Plugging the pass values of array 86 into Equation (3), short-term pass value 94 is equal to about 71.93 (rounded to the nearest one-hundredth), as illustrated in FIG. 4.

In block 168, short-term pass value 94 and short-term weight 96 are placed at the top of short-term array 82, as illustrated in FIG. 8. Short-term array 82 retains only the 10 most recent entries. If the length of short-term array 82 exceeds 10 entries with the most recent entry, the oldest entry (based on the time stamp) is discarded from short-term array 82. Upon placing the results in short-term array 82, the statistical method returns to block 104 of FIG. 5.

In the illustrated embodiment, the values used in long-term array 80 and short-term array 82 are rounded to the nearest one-hundredth. However, other value approximations may be used to alter the effects of any rounding errors.

Short-Term Analysis

Once the daily analysis (block 102) is complete, the statistical method returns to block 104 of FIG. 5. In block 104, if the short-term daily criteria of Table 2 were not satisfied in the daily analysis, the controller 18 proceeds to the long-term analysis that begins in block 118. If the short-term daily criteria were satisfied in the daily analysis, controller 18 proceeds to analyze short-term array 82 of FIG. 8 to determine if a pass-fail test conclusion can be made. As represented by block 106, controller 18 determines if a crossover occurred in short-term array 82 with the most recent pass value entry. A crossover occurs when two adjacent pass value entries in an array, illustratively long-term array 80 or short-term array 82, are on either side of the pass-fail threshold, which illustratively has a value of 100. In particular, a crossover indicates that two adjacent pass value entries in the array have transitioned from a passing value to a failing value, or vice versa. If controller 18 determines that a crossover occurred in short-term array 82, all entries in short-term array 82 are cleared except for the most recently obtained entry, as represented by block 108. When a crossover is detected, a test conclusion of "pass" or "fail" cannot be made with the short-term analysis, and controller 18 proceeds to attempt to perform the long-term analysis. No crossovers are present in exemplary short-term array 82 because each pass value entry has a value of less than 100.

Whenever a crossover occurs in short-term array 82, controller 18 attempts to ensure that the transition of the pass values from passing to failing or failing to passing is not a transient event. Clearing the entries of short-term array 82 upon detection of a crossover serves to increase the likelihood that a test conclusion of "fail" from the short-term analysis is due to an actual leak and not any thermal anomalies.

If no crossover is detected in short-term array 82, controller 18 determines if short-term array 82 is full (i.e., contains 10 entries), as represented by block 110. If short-term array 82 is not full, controller 18 proceeds to the long-term analysis that begins in block 118. If short-term array 82 is full, the weighted average of all entries in short-term array 82 is computed, as represented by block 112. The weighted average is determined according to Equation (3) above. Using the exemplary data from short-term array 82 of FIG. 8, the weighted average of short-term array 82 is equal to about 70.32. In block 112, the calculated weighted average of the pass values of short-term array 82 is compared to the pass-fail threshold value of 100 to reach a pass-fail conclusion. If the weighted average is less than 100, the test conclusion is declared a "pass" at block 116. If the weighted average is greater than or equal to 100, the test conclusion is declared a "fail" at block 114. Based on the data of short-term array 82 of FIG. 8, 70.32 is less than 100, and the test conclusion is declared a "pass" at block 116.

Long-Term Analysis

If a test conclusion based on short-term array 82 is not possible, long-term array 80 is examined by controller 18 in the long-term analysis. As represented by block 118, if long-term array 80 is not full (typically 30 entries), no further action is taken and controller 18 returns to block 100 to collect additional individual test data. As represented by block 120, if long-term array 80 is full, controller 18 proceeds to perform the long-term analysis of FIGS. 7 and 7A to determine if a test conclusion can be made with the existing values of long-term array 80 or if additional individual test data must be collected.

Figure 7:
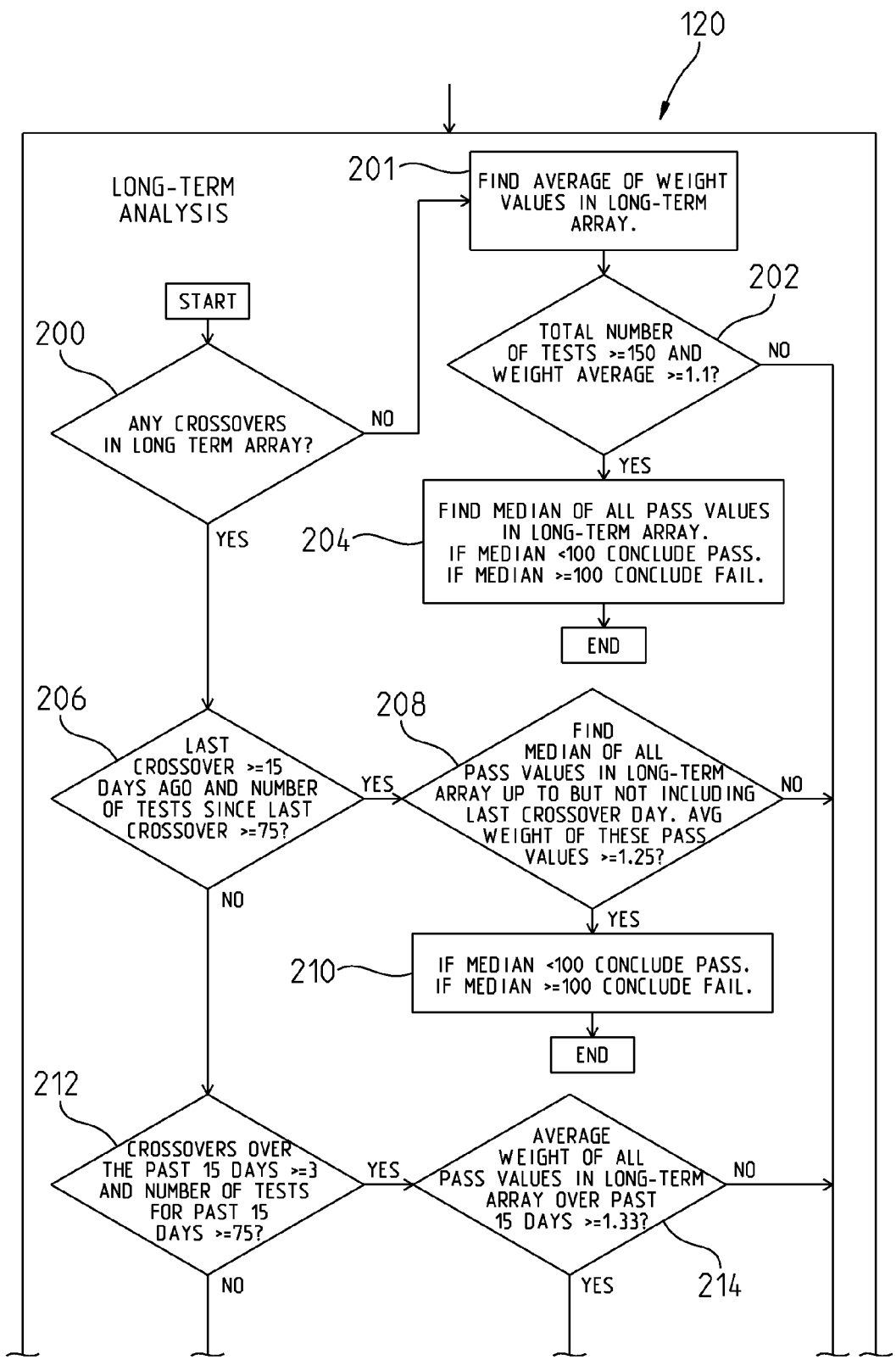
FIGS. 7 and 7A illustrate a flowchart of an exemplary long-term analysis of the statistical method of FIG. 5.

Referring to FIG. 7, controller 18 determines if long-term array 80 contains any crossovers, as represented by block 200. If a crossover is not detected in block 200, the average of the weight values in long-term array 80 is calculated in block 201. As represented by block 202, the calculated average weight value is compared to a threshold value of 1.1, and the number of individual tests performed in the past 30 days is compared to a threshold value of 150. Alternatively, other appropriate threshold values may be used. In the illustrated embodiment, if the calculated average weight value is less than 1.1 or the total number of tests performed is less than 150, controller 18 does not make a test conclusion based on the existing test data in long-term array 80. Accordingly, as represented by block 216 of FIG. 7A, controller 18 waits until more higher-weighted test values populate long-term array 80 or until a test conclusion is reached by another method or analysis, i.e., by the standard direct method or by the short-term analysis of the statistical method.

If the weight average of long-term array 80 is greater than or equal to 1.1 and the number of tests is greater than or equal to 150, the median of all pass values in long-term array 80 is determined. This median pass value is used to reach a test conclusion, as represented by block 204. If the median pass value is less than 100, a test conclusion of "pass" is declared by controller 18. If the median pass value is greater than or equal to 100, a test conclusion of "fail" is declared by controller 18.

If a crossover is detected in long-term array 80 in block 200, controller 18 determines if the most recent crossover occurred 15 or more days ago, i.e., whether a crossover occurred before the previous 15 entries in long-term array 80, as represented by block 206. If the last crossover occurred 15 or more days ago, and if the number of individual leak tests performed since the last crossover is greater than or equal to 75, controller 18 makes several determinations, as represented by block 208. In block 208, controller 18 determines the median of, as well as the associated average weight of, the pass values in long-term array 80 that were obtained since the last crossover occurred. This includes all pass values since, but not including, the last crossover day until the most recently obtained pass value. If the calculated weight average of these pass values is less than 1.25, a test conclusion cannot be made and the statistical analysis returns to block 100 of FIG. 5. If the calculated weight average of these pass values is greater than or equal to 1.25, a test conclusion may be made according to block 210. In block 210, if the median value is less than 100, a test conclusion of "pass" is declared by controller 18. If the median value is greater than or equal to 100, a test conclusion of "fail" is declared by controller 18.

Referring again to block 206 of FIG. 7, if the last crossover occurred less than 15 days ago or the number of tests since the last crossover is less than 75, several conditions must be met in order for controller 18 to reach a test conclusion. As represented by block 212, if at least 3 crossovers have occurred within the previous 15 days and the number of individual tests over the previous 15 days is at least 75, the long-term analysis proceeds to block 214 and a test conclusion may be reached. However, if less than 3 crossovers have occurred within the previous 15 days or the number of individual tests over the previous 15 days is less than 75, a test conclusion is not possible and the analysis returns to block 100 of FIG. 5 to collect more data, as represented by block 216 of FIG. 7A. Using the exemplary data of long-term array 80 in FIG. 8, four crossovers are detected in the previous 15 days, and 223 total tests were performed over the previous 15 days. As such, the conditions of block 212 are satisfied and the analysis proceeds to block 214.

In block 214, the average weight value of the pass values in long-term array 80 from the previous 15 days is determined. If the calculated average weight value of these pass values is less than 1.33, a test conclusion is not possible and the analysis returns to block 100 to collect more data, as represented by block 216 of FIG. 7A. If the calculated average weight value of these pass values is greater than or equal to 1.33, a test conclusion may be possible and the analysis proceeds to block 218 of FIG. 7A. Using the exemplary data of long-term array 80 in FIG. 8, the average weight value of the pass values from the previous 15 days is equal to 1.58. As such, the condition of block 214 is satisfied and the analysis proceeds to block 218.

Figure 9:
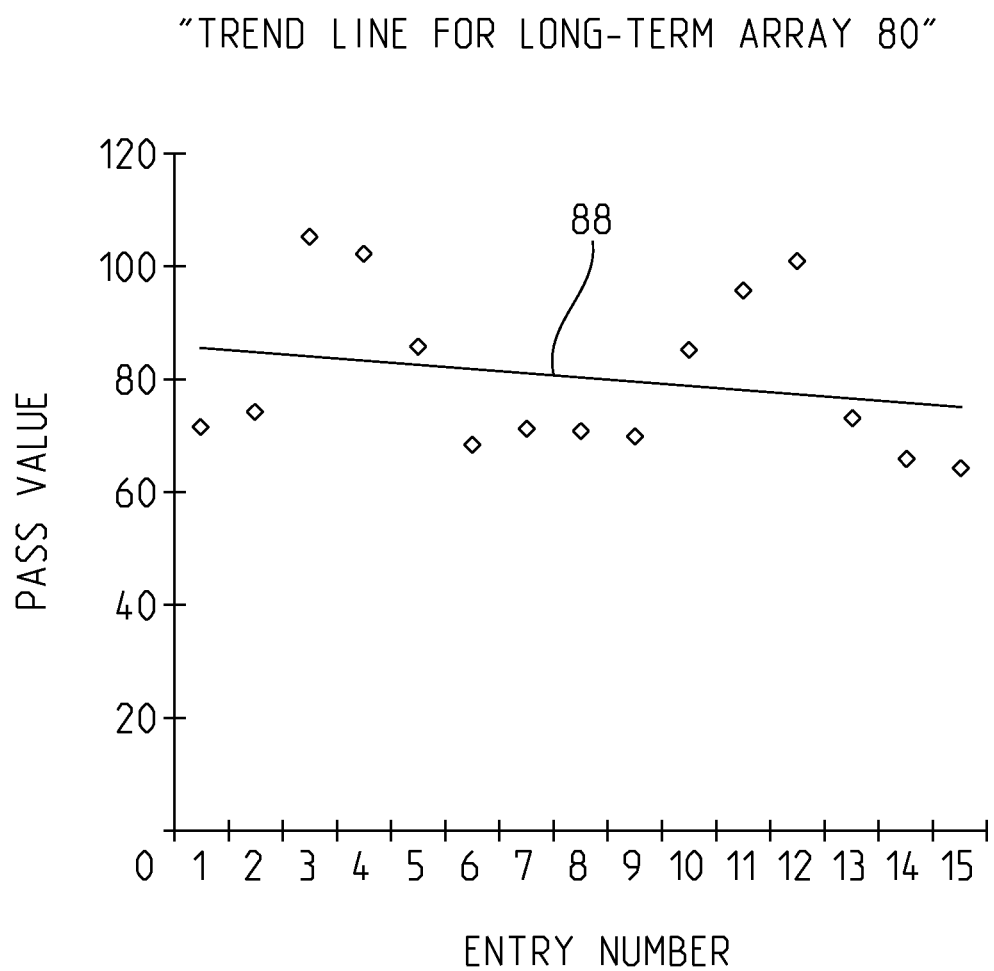
FIG. 9 illustrates an exemplary graph representing data from the long-term array of FIG. 8.

In block 218, the weighted average of the pass values in long-term array 80 from the previous 15 days is calculated. The weighted average of these pass values may be calculated according to Equation (3). In addition, a trend line of these pass values is determined, as represented by block 218. An exemplary trend line 88 illustrated in FIG. 9 is based on the exemplary data from long-term array 80 of FIG. 8. As represented by block 220, the calculated weighted average of these pass values and the slope of the trend line are examined and a test conclusion may be made according to Table 3.

TABLE 3

Long-Term Analysis of Trend Lines

| Trend Line Slope | Pass Value Weighted Average >=100? | Test Conclusion |
| --- | --- | --- |
| Level | NO | PASS |
| Increasing | NO | Wait if avg >=80 but <100, else PASS |

TABLE 3-continued

Long-Term Analysis of Trend Lines

| Trend Line Slope | Pass Value Weighted Average >=100? | Test Conclusion |
|---|---|---|
| Decreasing | NO | PASS |
| Level | YES | FAIL |
| Increasing | YES | FAIL |
| Decreasing | YES | Wait if avg <=120 but >99, else FAIL |

As illustrated in Table 3, if the trend line slope is substantially level and the pass value weighted average of long-term array 80 is less than 100, the test conclusion is "pass". However, if the trend line slope is substantially level and the pass value weighted average of long-term array 80 is greater than or equal to 100, the test conclusion is "fail".

Similarly, if the trend line slope is increasing and the pass value weighted average of long-term array 80 is less than 80, the test conclusion is "pass". If the trend line slope is increasing and the pass value weighted average of long-term array 80 is greater than or equal to 80 but less than 100, a test conclusion is not possible and controller 18 must collect more data. If the trend line slope is increasing and the pass value weighted average of long-term array 80 is greater than or equal to 100, the test conclusion is "fail".

Similarly, if the trend line slope is decreasing and the pass value weighted average of long-term array 80 is less than 100, the test conclusion is "pass". If the trend line slope is decreasing and the pass value weighted average of long-term array 80 is less than or equal to 120 but greater than 99, a test conclusion is not possible and controller 18 must collect more data. If the trend line slope is decreasing and the pass value weighted average of long-term array 80 is greater than 120, the test conclusion is "fail".

In one embodiment, a trend line slope between and including -1.33 and 1.33 is considered "level". Accordingly, a trend line slope of less than -1.33 is considered "decreasing", and a trend line slope of more than 1.33 is considered "increasing". However, other slope limits may be implemented to define "level", "increasing", and "decreasing".

Referring to FIG. 8, the weighted average of the exemplary pass values in long-term array 80 is equal to about 80.41. Referring FIG. 9, trend line 88 has a slope of approximately -0.734. Accordingly, trend line 88 is substantially level because its slope falls between -1.33 and 1.33. Referring to the conditions of Table 3, the test conclusion based on long-term array 80 of FIG. 8 is a "pass".

Figure 7A:
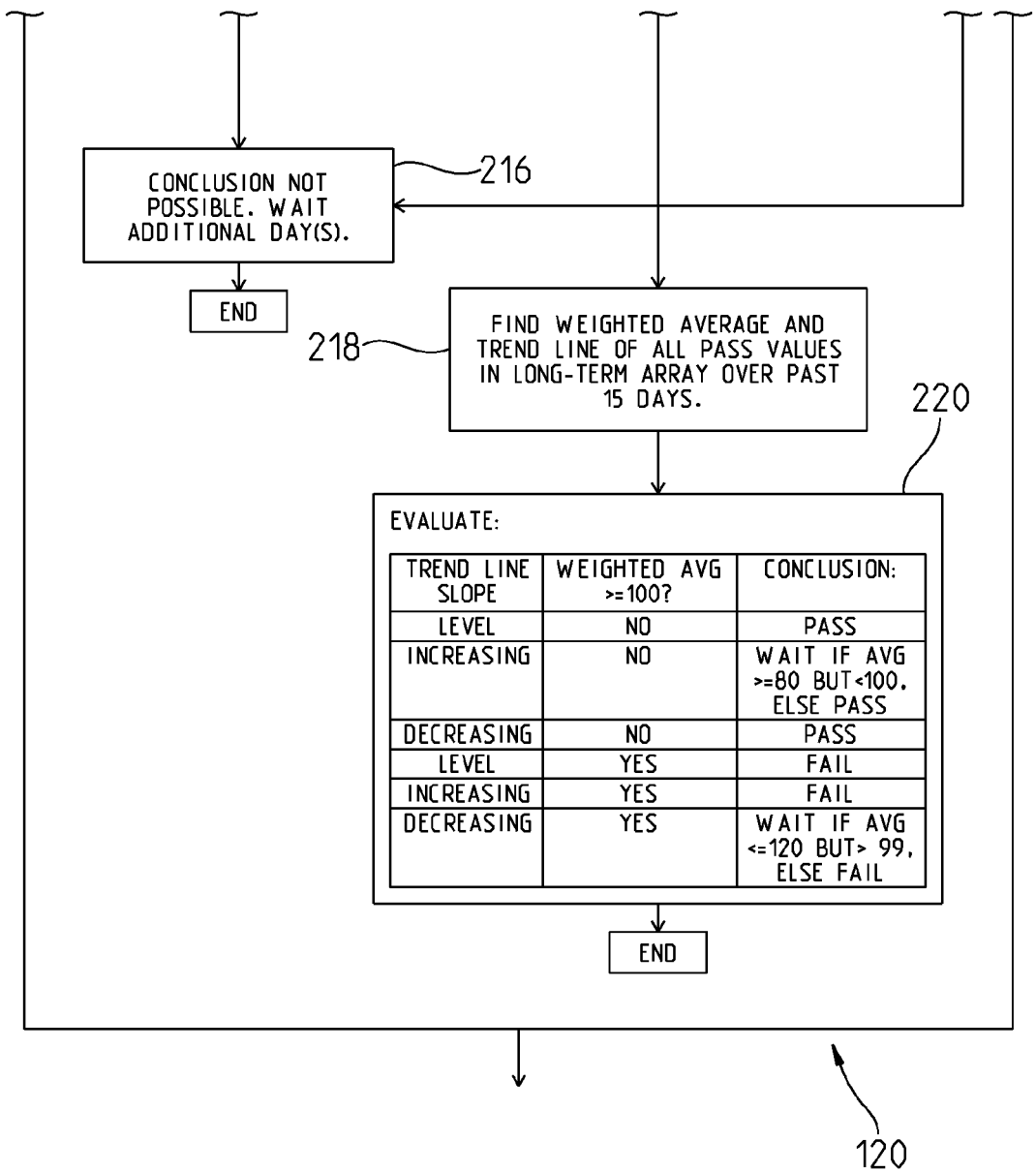

Upon completion of the long-term analysis in FIGS. 7 and 7A, the statistical method determines whether a test conclusion was reached by the long-term analysis, as represented by block 122 in FIG. 5. If a test conclusion was not reached, controller 18 returns to block 100 to collect additional data. If a test conclusion was reached, controller 18 declares a "pass" or "fail" depending on the test conclusion, as represented by block 124, before returning to block 100 to collect additional data.

Whenever the long-term analysis fails to reach a test conclusion, the analysis returns to block 100 of FIG. 5 to collect additional data. This cycle repeats until the long-term analysis reaches a test conclusion or until either the short-term analysis or standard method is able to reach a test conclusion.

In one embodiment, when a test conclusion of "pass" is reached via either the standard method or the statistical method, the statistical method does not reset but continues to run. As such, the pass value data history of long-term array 80 and short-term array 82 is maintained in memory 22 of controller 18.

In one embodiment, once all entries of short-term array 82 (see FIG. 8) are filled, and as long as the short-term criteria of Table 2 are met, controller 18 provides a test conclusion each day either via the statistical or standard methods. In the event that a site is very busy and the short-term analysis cannot produce a test conclusion, the long-term analysis may provide a test conclusion within a 30-day period.

If a failing test conclusion is reached by either the standard method or the statistical method, and the user has elected for automatic shutdown of exemplary fuel delivery system 10 in the event of a failing test conclusion, the statistical method will reset and will wait for the user to restart exemplary fuel delivery system 10. In one embodiment, the statistical method will also reset if a user disables leak testing for a period exceeding a set time limit, such as three days or any other suitable period. In one embodiment, upon reset of the statistical method, the pass value data history is deleted from memory 22 of controller 18.

In one embodiment, the statistical leak detection method augments the standard direct method of line leak detection. Both methods may work in tandem to help ensure that even busy sites will remain in compliance with precision leak testing standards.

Figure 10:
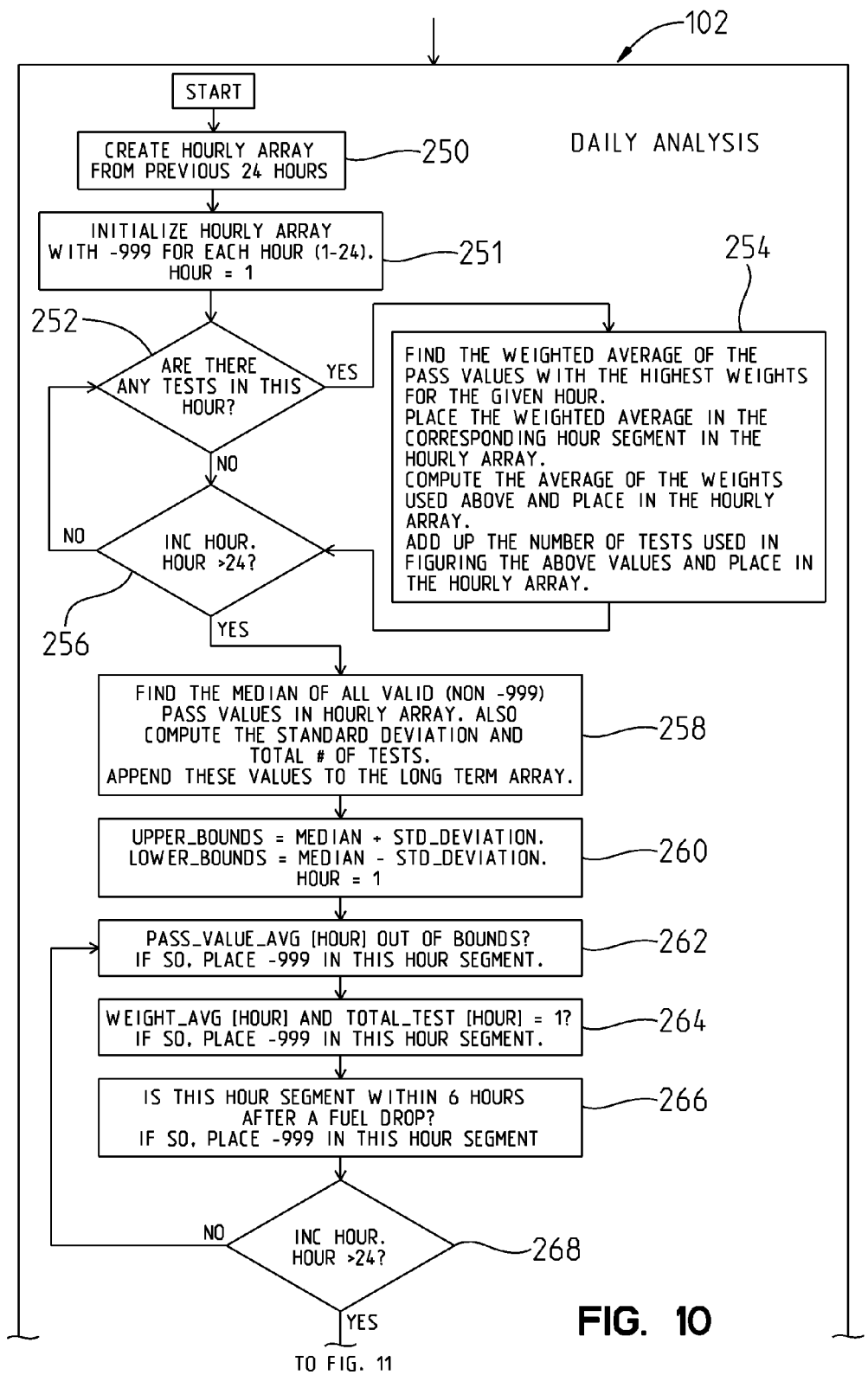
FIGS. 10 and 11 illustrate a flowchart of another exemplary daily analysis of the statistical method of FIG. 5.
Figure 11:
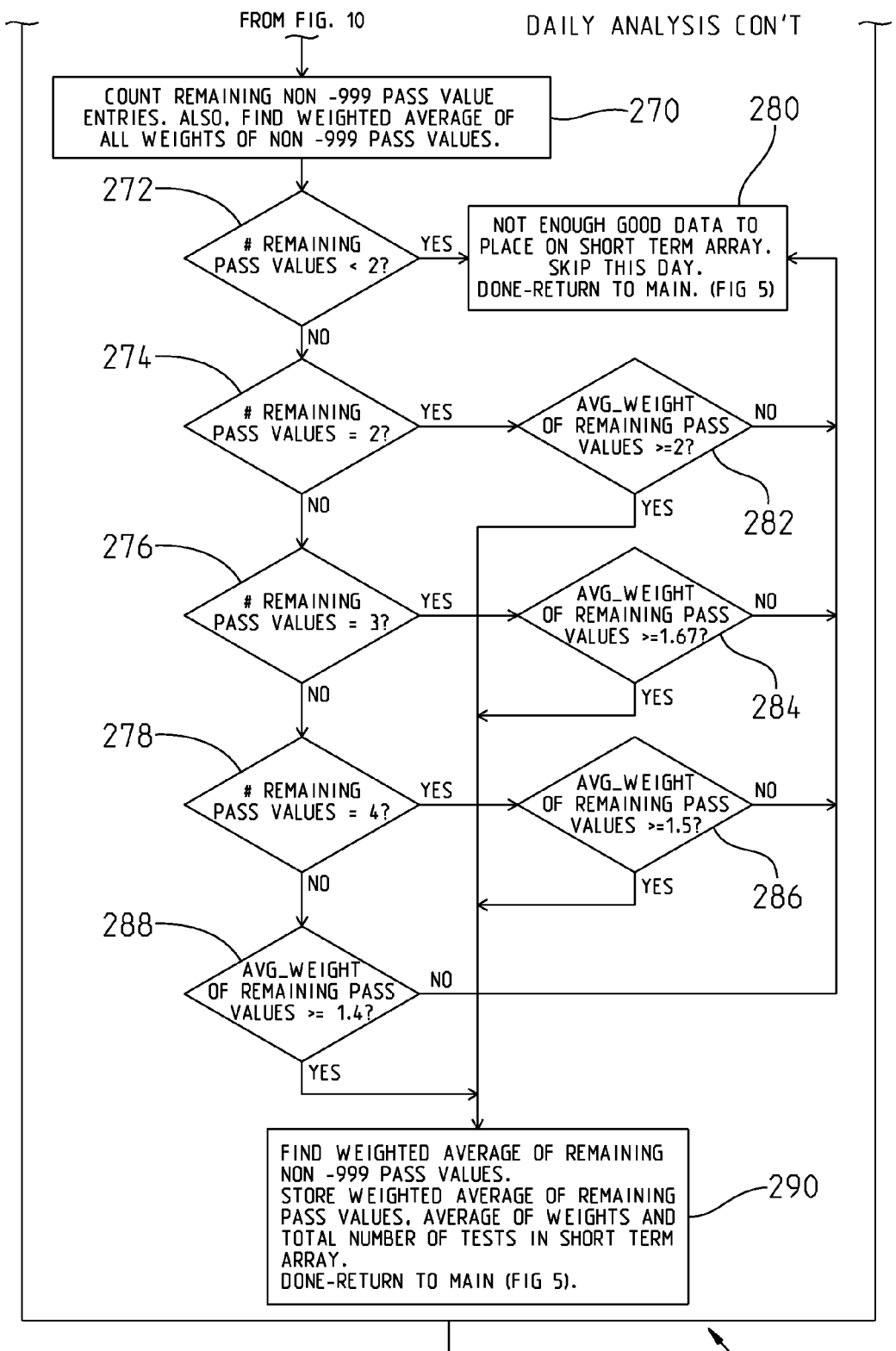
Figure 12:
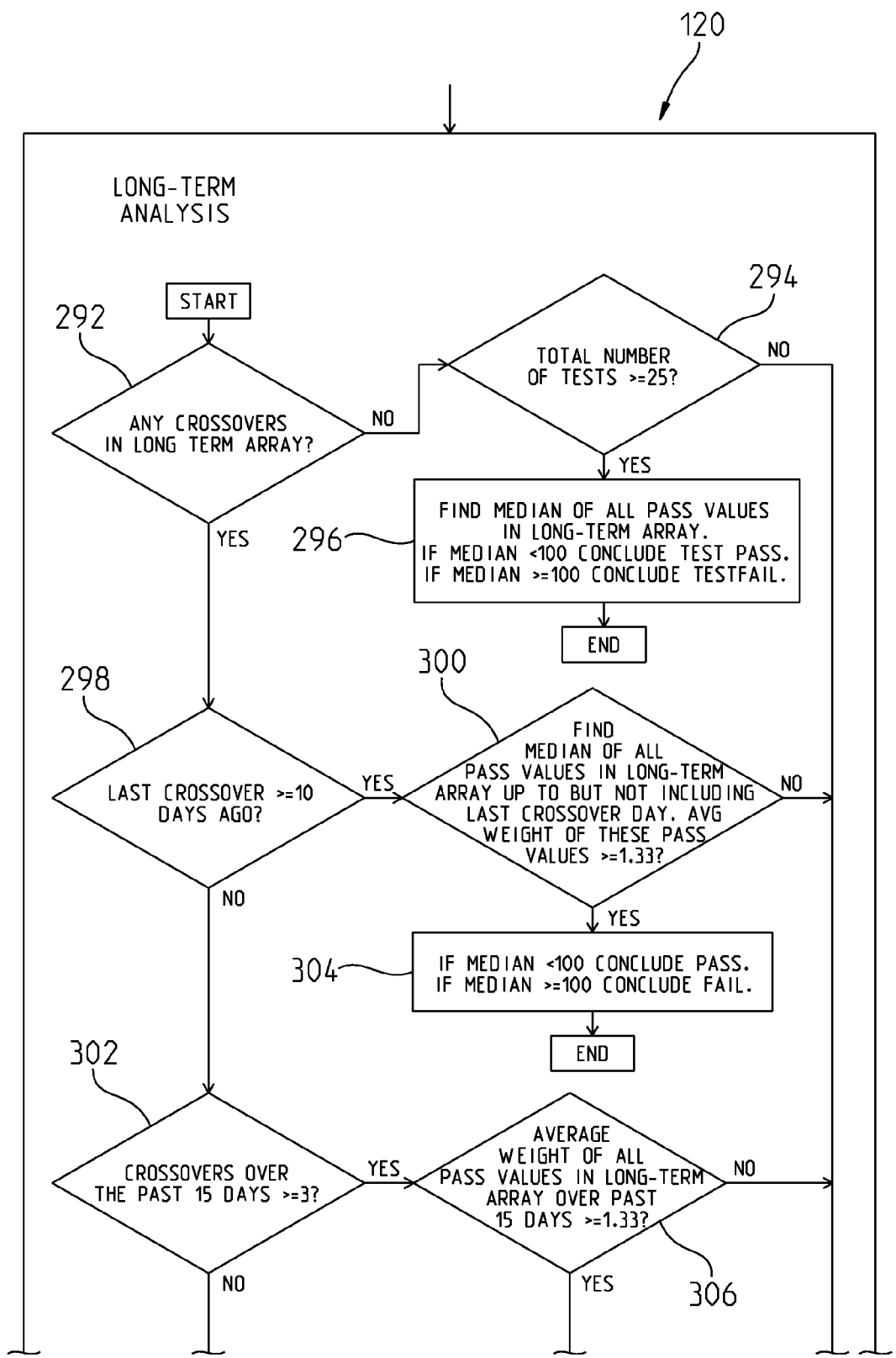
FIGS. 12 and 12A illustrate a flowchart of another exemplary long-term analysis of the statistical method of FIG. 5.

Referring to FIGS. 10-12, another exemplary daily analysis (block 102) and another exemplary long-term analysis (block 120) of the statistical leak detection method of FIG. 5 are provided. The daily analysis of FIGS. 10 and 11 may used in place of the daily analysis of FIG. 6. Similarly, the long-term analysis of FIG. 12 may be used in place of the long-term analysis of FIG. 7.

In the daily analysis of block 102 illustrated in FIG. 10, controller 18 creates an hourly array (see Table 5) by dividing the previous day into 24 one-hour segments, as represented by block 250. Controller 18 uses the hourly array to assign pass values to each one-hour segment according to their time stamp, as described herein. In block 251, controller 18 initializes each hour in the hourly array with a placeholder value, such as -999, and sets an hour counter to "1". The hour counter serves to allow controller 18 to cycle through each hour in the hourly array in blocks 252-256. The placeholder value serves to hold the place of the corresponding one-hour segment in the event no individual leak tests were performed in that hour.

In blocks 252-256, controller 18 steps through each hour of the hourly array and determines which pass value entries stored in a daily array of memory 22 have a time stamp falling within each hour. An exemplary daily array is illustrated in Table 4. An exemplary hourly array based on the data from the daily array of Table 4 is illustrated in Table 5. If at least one individual leak test was performed in a one-hour segment identified by the hourly array, controller 18 performs a series of calculations on the pass value data collected during that hour, as represented by block 254.

In block 254, controller 18 calculates the weighted average of the pass values that are associated with the highest order weights within each one-hour segment containing leak test data. Equation (2) may be used to determine the highest order weight. For example, if the weight values for a one-hour segment are 1, 2, 3, 1, 2, then the highest order weight value is equal to INT(3/2)+1=2. As such, only pass values having a weight value of 2 or greater are used in determining the weighted average of the pass values in the one-hour segment.

The weighted average of the pass values may be calculated according to Equation (3). In particular, the weighted average is found by including the pass value n times in the average calculation, where n is the weight of the pass value. For example, the pass value having a weight value of "2" would be counted twice in determining the average of the pass values in a given one-hour segment. In one embodiment, if the pass values in a given one-hour segment all have a weight of "1", controller 18 determines the median, rather than the average, of the pass values in the one-hour segment.

In block 254, the calculated weighted average of the pass values is stored in the appropriate one-hour segment of the hourly array, as shown in Table 5. In addition, the average of the higher-order weights used in the calculation of the pass value weighted average is computed and stored in the hourly array, as shown in Table 5. In addition, the number of individual tests that were included in the calculation of the pass value weighted average are determined and stored in the hourly array, as shown in Table 5. The number of weighted tests is equal to the sum of the higher-order weight values used in the weighted average calculation.

TABLE 4

Daily Array

| Time | Pass value | Test # (weight) |
|---|---|---|
| 01:24:14 | 73 | 1 |
| 01:36:54 | 73 | 2 |
| 01:49:34 | 64 | 3 |
| 02:22:00 | 82 | 1 |
| 02:23:40 | 73 | 2 |
| 02:36:18 | 73 | 3 |
| 02:56:06 | 82 | 1 |
| 03:14:08 | 73 | 1 |
| 03:26:48 | 99 | 1 |
| 04:10:20 | 55 | 1 |
| 04:28:12 | 73 | 1 |
| 04:58:32 | 63 | 1 |
| 05:31:42 | 71 | 1 |
| 05:49:16 | 54 | 1 |
| 06:01:56 | 72 | 2 |
| 10:42:47 | 91 | 1 |
| 12:03:24 | 73 | 1 |
| 12:21:16 | 64 | 1 |
| 13:56:04 | 73 | 1 |
| 21:10:20 | 92 | 1 |
| 22:04:20 | 84 | 1 |
| 22:59:34 | 83 | 1 |
| 23:31:38 | 74 | 1 |

TABLE 5

Hourly Array

| Hour | Avg Hourly Pass Value | Weighted Avg. | Weighted # of tests |
|---|---|---|---|
| 0 | no tests | — | — |
| 1 | 68 | 2.5 | 5 |
| 2 | 73 | 2.5 | 5 |
| 3 | 86 | 1 | 2 |
| 4 | 63 | 1 | 3 |
| 5 | 63 | 1 | 2 |
| 6 | 72 | 2 | 2 |
| 7 | no tests | — | — |
| 8 | no tests | — | — |
| 9 | no tests | — | — |
| 10 | 91 | 1 | 1 |
| 11 | no tests | — | — |
| 12 | 69 | 1 | 2 |
| 13 | 73 | 1 | 1 |
| 14 | no tests | — | — |
| 15 | no tests | — | — |
| 16 | no tests | — | — |
| 17 | no tests | — | — |

TABLE 5-continued

Hourly Array

| Hour | Avg Hourly Pass Value | Weighted Avg. | Weighted # of tests |
|---|---|---|---|
| 18 | no tests | — | — |
| 19 | no tests | — | — |
| 20 | no tests | — | — |
| 21 | 92 | 1 | 1 |
| 22 | 84 | 2 | 1 |
| 23 | 74 | 1 | 1 |

For example, referring to Tables 4 and 5, no data was collected in the first hour (hour "0") of the day. In hour "1", three individual leak tests were performed, and the highest weight value is "3". Using Equation (2), the pass values having weights greater than or equal to "2" are used to calculate the weighted average for hour "1". The weighted average of pass values 73 and 64 are calculated according to Equation (3), resulting in a pass value weighted average of 68 (rounded to nearest whole number) for hour "1", as shown in Table 5. The average of the weight values utilized in the calculation of the weighted average is (3+2)/2, or 2.5, as shown in Table 5. Similarly, the total number of tests is the sum of the higher-order weight values, or 5. The remaining entries of the hourly array of Table 5 are calculated in a similar fashion. In hour "4", since all weight values are "1", the median of the pass values, or 63, is used as the weighted average.

As represented by block 256, controller 18 continues to block 258 once all hours in the day have been examined. In block 258, controller 18 calculates the median of, and the standard deviation of, all of the average hourly pass values of Table 5. For example, based on the data in the hourly array of Table 5, the median is 73, and the standard deviation is 10. The controller stores this data along with the total number of tests from the day in a long-term array, such as long-term array 80 of FIG. 8.

As represented by block 260, controller 18 calculates an upper bounds as the calculated median plus the standard deviation, or 73+10, or 83. Similarly, controller 18 calculates a lower bounds as the calculated median less the standard deviation, or 73−10, or 63. The upper and lower bounds are stored in memory 22 of controller 18.

In blocks 260-268, controller 18 steps through each hour in the hourly array of Table 5 and discards certain values in order to prepare data for the short-term analysis. As represented by block 262, controller 18 discards all hourly pass values in the hourly array that lie outside of the upper and lower bounds. In addition, controller 18 also discards all hourly pass values in the hourly array that have a weighted average of "1" and only one test associated therewith, as represented by block 264.

As represented by block 266, if a fuel drop occurred during the previous 24 hours, controller 18 discards hourly pass values that were obtained within a certain time period after the fuel drop. In one embodiment, all hourly pass values obtained within 6 hours of the fuel drop are discarded. Alternatively, controller 18 could perform a trend-line analysis on the pass value points after the delivery time and throw away those points that are not within the allowed trend-line. As represented by block 268, controller 18 proceeds to block 270 (see FIG. 11) after stepping through each hour of the hourly array.

Following the completion of the steps in blocks 260-268, a temporary array containing data for the short-term analysis is obtained. See, for example, the temporary array illustrated in Table 6, which is based on the data from the daily array of Table 4 and the hourly array of Table 5.

TABLE 6

Temporary Array for Short-Term Analysis

| Hour | Hourly Pass Value | Weighted Avg. | # of Tests |
|---|---|---|---|
| 1 | 68 | 2.5 | 5 |
| 2 | 73 | 2.5 | 5 |
| 4 | 64 | 1 | 3 |
| 5 | 63 | 1 | 2 |
| 6 | 72 | 2 | 2 |
| 12 | 69 | 1 | 2 |

Referring to FIG. 11, controller 18 determines if enough valid data has been collected over the previous 24 hours to proceed with the short-term analysis. As represented by block 270, controller 18 counts the number of remaining hourly pass values in the temporary array of Table 6. In addition, controller 18 computes the average of all of the weights associated with the remaining hourly pass values in the temporary array. As represented by blocks 272-288, the number of remaining hourly pass values and the calculated average of the weights for the remaining hourly pass values in the temporary array must meet the criteria set forth in Table 7. If the criteria of Table 7 are not met, then the available data is not suitable to place on the short-term array, such as short-term array 82 (see FIG. 8), as represented by block 280. As such, controller 18 must wait and collect data for another 24 hours.

TABLE 7

Criteria for Short-Term Analysis

| # of Hourly Pass Values | Minimum Average Weight |
|---|---|
| 1 | — |
| 2 | 2.0 |
| 3 | 1.67 |
| 4 | 1.5 |
| 5+ | 1.4 |

If the criteria of Table 7 are met, controller 18 calculates a weighted average of the hourly pass values in the temporary array illustrated in Table 6, as represented by block 290. The weighted average may be calculated according to Equation (3). Accordingly, controller 18 stores the following in short-term array 82: the calculated weighted average of the pass values of the temporary array, the calculated average of the weights in the temporary array, and the total number of tests in the temporary array.

For example, the average weight of the six hourly pass values in the temporary array illustrated in Table 6 is 1.67. Because 1.67 is greater than the required weight of 1.4 in Table 7, the data stored in the temporary array of Table 6 may be used in the short-term analysis. Accordingly, a weighted average of 69, an average weight of 1.67, and a total test count of 19 is stored in short-term array 82.

In some cases, the data collected and analyzed at the end of a 24-hour period may not be suitable for placing in short-term array 82. In these cases, another 24 hours will elapse before controller 18 collects more data and another analysis is performed. Once the results of the data analysis are acceptable, the data is placed in short-term array 82.

Upon completing the daily analysis, the statistical analysis returns to the main block diagram of FIG. 5 to perform the short-term analysis, as described above.

When short-term array 82 is full and the standard method has not been able to reach a conclusion, then the short-term data is considered valid and stable because of both the pre-screening performed by the daily analysis and the elimination of any "crossover" days. Impacts by thermal transients should be filtered out by this point and the median of the past 10 entries of short-term array 82 can be computed. If the median value is less than 100, controller 18 declares a test conclusion of "pass". If the median value is at least a 100, controller 18 declares a test conclusion of "fail".

When a test conclusion is reached whether by the standard method or by the short term analysis, the values on short-term array 82 are not discarded. Once short-term array 82 has reached a maximum length, illustratively a length of 10, additional daily data is placed at the top of short-term array 82, and the oldest data is thrown out. As such, short-term array 82 always represents the most recent data history.

Figure 12A:
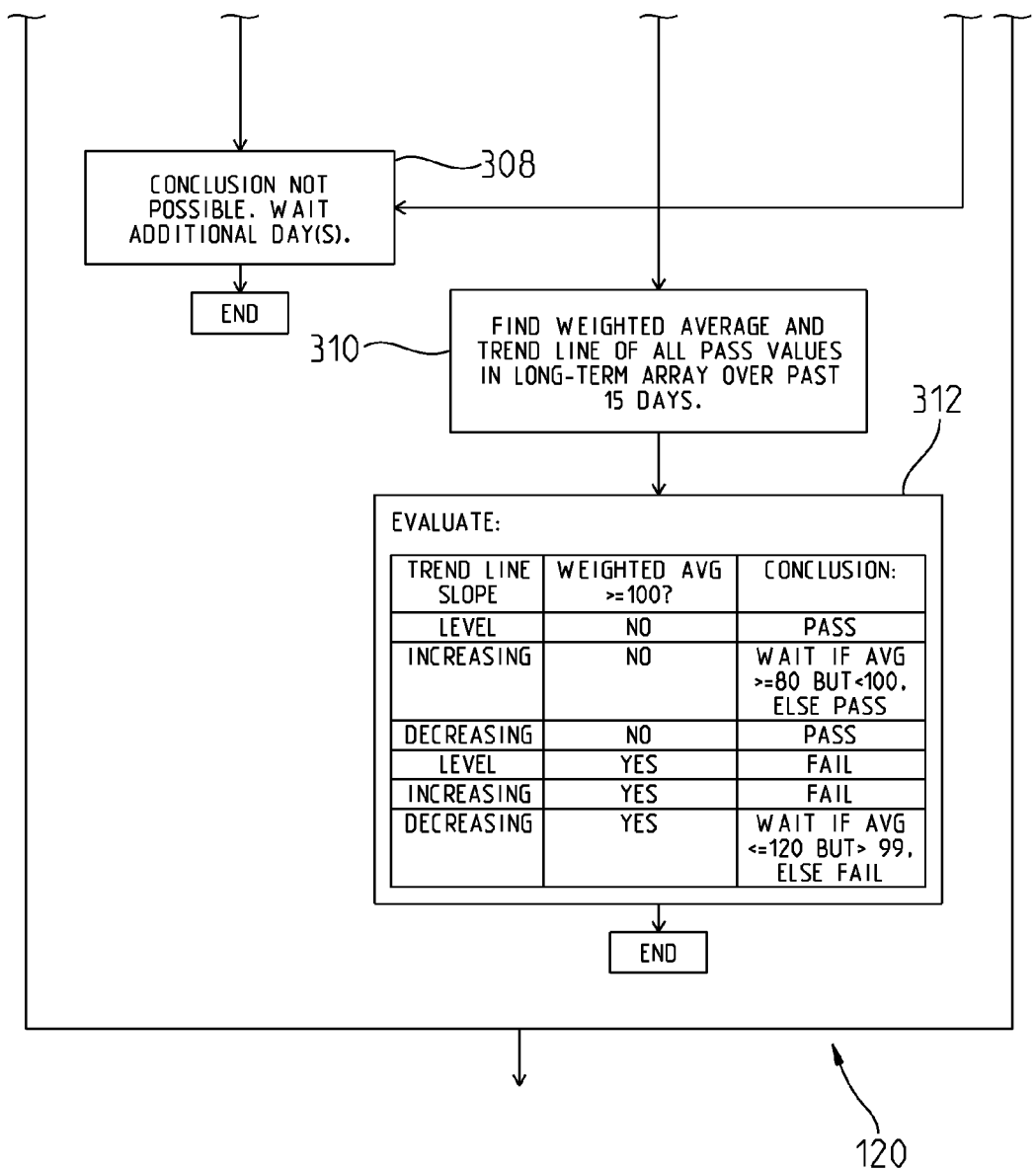

In one embodiment, if both the short-term analysis and the standard direct method fail to produce a test conclusion, controller 18 proceeds to the long-term analysis illustrated in FIGS. 12 and 12A. When long-term array 80 reaches a maximum length, illustratively a length of 30, the long-term analysis is performed.

Referring to FIG. 12, controller 18 determines whether any crossovers occurred in long-term array 80, as represented by block 292. If no crossovers occurred in long-term array 80 and if the total number of tests is greater than or equal to 25, the median of all pass values in long-term array 80 is computed, as represented by blocks 294 and 296. A median value of less than 100 results in a test conclusion of "pass", and a median value greater than or equal to 100 results in a test conclusion of "fail". If the total number of tests is less than 25, a test conclusion cannot be made and the system waits an additional day to collect additional data. Thus, the validity of the data is based on having long-term stability (no crossovers in long-term array 80) and on performing a sufficient number of individual leak tests over an extended period of time.

As represented by block 298, if one or more crossovers occurred in long-term array 80, and if the last crossover occurred at least 10 days ago, a test conclusion may be possible. As represented by block 300, controller 18 determines the median of, as well as the associated average weight of, the pass values in long-term array 80 that were obtained since the last crossover occurred. This includes all pass values since, but not including, the last crossover day until the most recently obtained pass value. If the calculated weight average of these pass values is less than 1.33, a test conclusion cannot be made. If the calculated weight average of these pass values is greater than or equal to 1.33, a test conclusion may be made according to the criteria set forth in block 304. In block 304, if the median value is less than 100, a test conclusion of "pass" is declared by controller 18. If the median value is greater than or equal to 100, a test conclusion of "fail" is declared by controller 18. Thus, the validity of the data is based on the time elapsed since the last crossover and the requirement of a higher percentage of higher weighted pass values.

If the last crossover occurred less than 10 days ago and if at least three crossovers occurred within the previous 15 days, a test conclusion may still be made if certain criteria are met, as represented by block 302. Otherwise, a test conclusion cannot be made and the analysis returns to FIG. 5, as represented by block 308 of FIG. 12A.

In block 306, the average weight value of the pass values in long-term array 80 from the previous 15 days is determined. If the calculated average weight value of these pass values is less than 1.33, a test conclusion is not possible and controller 18 must collect more data. If the calculated average weight value of these pass values is greater than or equal to 1.33, a test conclusion may be possible and the analysis proceeds to block 310 of FIG. 12A. In block 310, the weighted average of the pass values in long-term array 80 from the previous 15 days is calculated. The weighted average of these pass values may be calculated according to Equation (3). In addition, a trend line of these pass values is determined. An exemplary trend line may be the trend line of FIG. 9. As represented by block 312, the calculated weighted average of these pass values and the slope of the trend line are examined and a test conclusion may be made according to Table 3.

If the criteria of Table 3 are not met then a conclusion cannot be made. As such, controller 18 must wait another day to collect more test pass values. This cycle repeats until the long-term analysis reaches a test conclusion or until either the short-term analysis or standard method is able to reach a test conclusion.

In one embodiment of the present disclosure, a statistical line leak detection method and apparatus is provided. The statistical line leak detection method includes collecting short individual leak test result values between dispensing intervals throughout a 24-hour day. The individual leak test result values may be analyzed and condensed at the end of the day and placed in a rolling history array for analysis at subsequent times. The statistical line leak detection method may assign a weight value 'figure of merit' to each individual leak test result based upon its relative position in a string of consecutive individual leak tests. The statistical line leak detection method may filter out the lower weighted leak test values in order to minimize the impact of thermal expansion errors in the individual test results. The statistical line leak detection method may discard individual leak test results that occurred within a set amount of time after a fuel drop in order to minimize thermal expansion errors in the individual test results.

In one embodiment of the present disclosure, a statistical line leak detection method is provided that employs a short-term individual test collection period using only higher weighted individual test results in order to produce a line tightness test conclusion based on the weighted average of the higher weighted individual tests over a relatively short number of days.

In one embodiment of the present disclosure, a statistical line leak detection method is provided that employs a long-term individual test collection period using all individual test results in order to produce a line tightness test conclusion based on the weighted average of the medians of the individual tests in a given weight group collected over a longer period of time as compared to the short-term collection.

In one embodiment of the present disclosure, a statistical line leak detection method is provided that employs both a short-term and a long-term individual test collection period whereby if the test result quality constraints of the short-term analysis do not permit a line tightness test conclusion then the long-term analysis will produce a result provided that its longer history array is populated with daily test results.

In one embodiment of the present disclosure, a statistical line leak detection method is provided whereby if previous individual test results suddenly change state from passing to failing or failing to passing, then the short-term and long-term line tightness conclusions will be delayed in order to ensure a correct line tightness conclusion at a later time.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A leak detection system for a fuel delivery system including a fuel line, the leak detection system comprising:
   a sensor coupled to the fuel line;
   a controller coupled to the sensor and configured to perform a plurality of leak tests on the fuel line between periods of fuel delivery based on an output of the sensor, each respective leak test producing test data used by the controller to determine a measure of a leak rate of the fuel line during the respective test interval, the controller determining the presence of a leak in the fuel line based on the measures of the leak rates for at least a portion of the plurality of leak tests, a first leak test of the portion occurring prior to a first fuel delivery event and a second leak test of the portion occurring subsequent to the first fuel delivery event.

2. The leak detection system of claim 1, wherein the controller determines the measure of the respective test interval by determining a leak rate associated with the test interval and comparing the leak rate to a threshold leak rate.

3. The leak detection system of claim 2, wherein the measure of the respective test interval includes a pass value having a first range of values indicating a leak condition and a second range of values indicating a non leak condition.

4. The leak detection system of claim 3, wherein the pass value for the respective test interval is determined by determining a percentage of the leak rate associated with the test interval to the threshold leak rate.

5. The leak detection system of claim 3, wherein the measure of the respective test interval further includes a weight value corresponding to the pass value, the weight value representing an accuracy of the pass value.

6. The leak detection system of claim 5, wherein the weight value is a measure of a number of leak tests performed since an immediately preceding fuel delivery event.

7. The leak detection system of claim 5, wherein the controller determines the respective pass values and respective weight values for a plurality of respective test intervals in a collection timeframe.

8. The leak detection system of claim 7, wherein the collection timeframe is a twenty-four hour timeframe.

9. The leak detection system of claim 7, wherein the controller determines the presence of the leak in the fuel line through one of a first analysis having a first timeframe which spans multiple collection timeframes and a second analysis having a second timeframe which spans multiple collection timeframes, the second timeframe being longer than the first timeframe.

10. The leak detection system of claim 9, wherein in the first analysis for each collection timeframe a weighted average pass value is determined and an average weight value is determined.

11. The leak detection system of claim 10, wherein for each collection timeframe of the first timeframe the respective pass values and respective weight values for the plurality of respective test intervals are discarded when the average weight value of the collection timeframe is less than a threshold amount which is set based on the number of test intervals in the collection timeframe.

12. The leak detection system of claim 10, wherein the weighted average pass values and average weight values for at least a portion of collection timeframes of the first timeframe are analyzed to determine the presence of the leak in the fuel line.

13. The leak detection system of claim 12, wherein a weighted average pass value for the first timeframe is determined from the weighted average pass value and average weight value for the portion of collection timeframes of the first timeframe, the controller determining the presence of the leak in the fuel line when the weighted average pass value for the first timeframe is greater than a threshold and the absence of the leak in the fuel line when the weighted average pass value for the first timeframe is less than the threshold.

14. The leak detection system of claim 12, wherein the controller discards the weighted average pass values and average weight values for the portion of collection timeframes of the first timeframe when an instability in the weighted average pass values is detected.

15. The leak detection system of claim 9, wherein in the second analysis for each collection timeframe a weighted average pass value is determined, an average weight value is determined, and a total number of test intervals is determined.

16. The leak detection system of claim 15, wherein the weighted average pass values, the average weight values, and the total number of test intervals for at least a portion of the collection timeframes of the second timeframe are analyzed to determine the presence of the leak in the fuel line.

17. The leak detection system of claim 16, wherein if a sum of total number of test intervals of the second timeframe exceeds a test intervals threshold and an average of the average weight value for the collection timeframes of the second timeframe exceeds a weight average threshold, the controller determines the presence of the leak in the fuel line based on a comparison of a median weighted average pass value for the second timeframe and a threshold.

18. The leak detection system of claim 16, wherein the portion of the collection timeframes of the second timeframe includes all collection timeframes subsequent to a crossover in the weighted average pass values relative to a crossover value.

* * * * *